(12) United States Patent
Kuwabara

(10) Patent No.: US 8,866,968 B2
(45) Date of Patent: Oct. 21, 2014

(54) VIDEO PROCESSING DEVICE, AND VIDEO DISPLAY SYSTEM CONTAINING SAME

(75) Inventor: Takashi Kuwabara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/003,272

(22) PCT Filed: Feb. 8, 2012

(86) PCT No.: PCT/JP2012/000820
§ 371 (c)(1),
(2), (4) Date: Sep. 5, 2013

(87) PCT Pub. No.: WO2012/120781
PCT Pub. Date: Sep. 13, 2012

(65) Prior Publication Data
US 2013/0335628 A1    Dec. 19, 2013

(30) Foreign Application Priority Data

Mar. 10, 2011    (JP) .................................. 2011-052584

(51) Int. Cl.
*H04N 7/04*    (2006.01)
(Continued)

(52) U.S. Cl.
CPC ............. *H04N 7/24* (2013.01); *H04N 21/4316* (2013.01); *H04N 21/44218* (2013.01);
(Continued)

(58) Field of Classification Search
USPC ......... 348/469, 564, 565, 563, 556, 567, 555, 348/489, 492, 495, 474, 425.1, 523, 568, 348/571, 719, 715, 714, 231.3, 14.13; 386/123, 355; 382/232; 725/40, 89, 93, 725/115, 116, 142, 153, 18, 86, 146
See application file for complete search history.

(56) References Cited

U.S. PATENT DOCUMENTS 5,504,535 A * 4/1996 Abe .............................. 348/565
5,617,147 A * 4/1997 Ezaki ........................... 348/461
(Continued)

FOREIGN PATENT DOCUMENTS

| JP | 2001-086470 A | 3/2001 |
| JP | 2008-236489 A | 10/2008 |
| JP | 2009-147572 A | 7/2009 |

OTHER PUBLICATIONS

International Search Report for Application No. PCT/JP2012/000820, dated May 1, 2012.
(Continued)

*Primary Examiner* — Jefferey Harold
*Assistant Examiner* — Mustafizur Rahman
(74) *Attorney, Agent, or Firm* — RatnerPrestia

(57) ABSTRACT

Provided is a video processing device capable of displaying an easily viewable video utilizing a broader area in a display. A video processing unit that is included in the video processing device and processes an input video includes a first memory that stores the input video, a second memory that stores the input video, a compression/expansion control unit that compresses and/or expands a first area of the input video stored in the first memory and compresses and/or expands a second area of the input video stored in the second memory, and an image composing unit that generates an output video in which a video of the first area compressed and/or expanded by the compression/expansion control unit and a video of the second area compressed and/or expanded by the compression/expansion control unit are horizontally aligned.

20 Claims, 19 Drawing Sheets

(51) Int. Cl.
*H04N 21/431* (2011.01)
*H04N 7/24* (2011.01)
*H04N 21/4728* (2011.01)
*G06F 3/14* (2006.01)
*H04N 5/445* (2011.01)
*H04N 5/45* (2011.01)
*H04N 21/485* (2011.01)
*H04N 21/442* (2011.01)
*H04N 7/01* (2006.01)
*H04N 21/4402* (2011.01)
*H04N 5/262* (2006.01)
*H04N 21/426* (2011.01)

(52) U.S. Cl.
CPC .......... *H04N 7/0122* (2013.01); *H04N 21/4728* (2013.01); *H04N 21/440245* (2013.01); *H04N 5/2624* (2013.01); *G06F 3/1438* (2013.01); *H04N 5/44591* (2013.01); *G09G 2340/02* (2013.01); *G09G 2340/045* (2013.01); *H04N 5/45* (2013.01); *G06F 3/1423* (2013.01); *H04N 21/42653* (2013.01); *H04N 5/2628* (2013.01); *H04N 21/440272* (2013.01); *G09G 2360/12* (2013.01); *H04N 21/4858* (2013.01); *G09G 2354/00* (2013.01)
USPC ........... 348/469; 348/474; 348/489; 348/492; 348/495; 348/425.1; 348/523; 348/555; 348/556; 348/563; 348/564; 348/565; 348/567; 348/568; 348/571; 348/719; 348/715; 348/714; 348/231.3; 348/14.13; 725/18; 725/40; 725/86; 725/89; 725/93; 725/115; 725/116; 725/142; 725/146; 725/153

(56) References Cited

U.S. PATENT DOCUMENTS

| | | | |
|---|---|---|---|
| 5,638,485 A * | 6/1997 | Kobayashi et al. | 386/239 |
| 6,300,981 B1 * | 10/2001 | Kim et al. | 348/563 |
| 6,802,075 B2 * | 10/2004 | Gelissen | 725/32 |
| 8,077,194 B2 * | 12/2011 | Kenoyer et al. | 348/14.08 |
| 8,284,324 B2 * | 10/2012 | Horikoshi | 348/730 |
| 8,462,841 B2 * | 6/2013 | Schlanger et al. | 375/240 |
| 2006/0221192 A1 * | 10/2006 | Nakajima et al. | 348/207.99 |
| 2007/0268394 A1 | 11/2007 | Nonaka et al. | |
| 2007/0291153 A1 * | 12/2007 | Araki et al. | 348/333.05 |
| 2008/0079815 A1 * | 4/2008 | Choi | 348/211.3 |
| 2009/0153649 A1 | 6/2009 | Hirooka et al. | |
| 2010/0085370 A1 * | 4/2010 | Usui | 345/564 |
| 2010/0188579 A1 * | 7/2010 | Friedman | 348/565 |
| 2011/0033172 A1 * | 2/2011 | Ando et al. | 386/355 |
| 2013/0039637 A1 * | 2/2013 | Hailey | 386/261 |

OTHER PUBLICATIONS

Supplementary European Search Report for Application No. EP 12 75 5730, dated Jun. 6, 2014.

\* cited by examiner

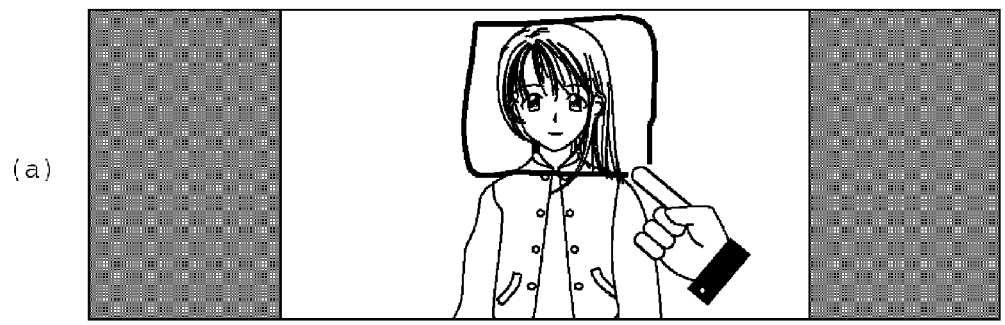
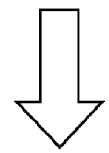
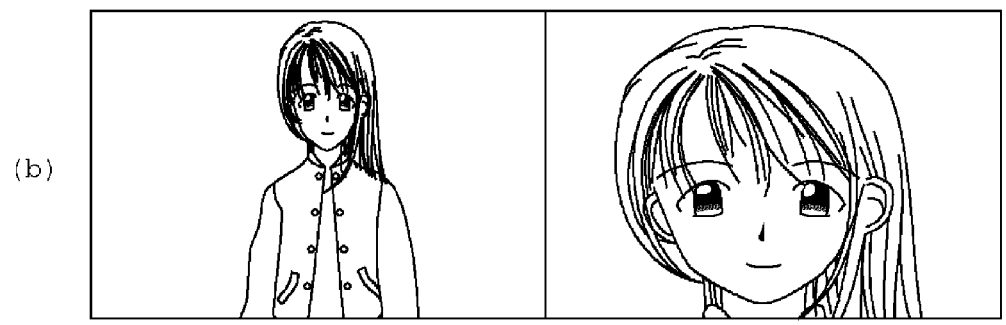
FIG.18

VIDEO PROCESSING DEVICE, AND VIDEO DISPLAY SYSTEM CONTAINING SAME

RELATED APPLICATION

This application is a U.S. national phase application of PCT International Application PCT/JP2012/000820, filed Feb. 8, 2012, which claims the benefit of Japanese Patent Application No. 2011-052584, filed on Mar. 10, 2011, and the entire disclosures of which are incorporated herein by reference.

TECHNICAL FIELD

The present invention relates to a video processing device processing an input video and a video display system containing the video processing device.

BACKGROUND ART

Conventionally, video processing devices are known which compress and/or expand a video that is input (hereinafter, referred to as an "input video") in the vertical direction (or the column direction) and/or the horizontal direction (or the row direction) (hereinafter, referred to as "vertical and horizontal directions") in accordance with the aspect ratio of a display and display the video (for example, see Patent Literature 1). According to such video processing devices, even when the aspect ratios of an input video and a display do not match each other, by compressing and/or expanding the input video in the vertical and/or horizontal directions, the video can be displayed using the whole display.

Recently, displays are configured to have various aspect ratios according to the uses thereof. For example, as a display used for the rear seat of a vehicle, a display is also proposed which has an aspect ratio (for example, horizontal:vertical=30:9) that is extremely horizontally longer than a display having a general aspect ratio (for example, horizontal:vertical=16:9).

CITATION LIST

Patent Literature

Patent Literature 1: JP 2001-086470 A

SUMMARY OF INVENTION

Technical Problem

However, when an input video of a general aspect ratio is compressed and/or expanded so as to match an extremely horizontally long display, the input video becomes extremely horizontally long to be uncomfortable to view.

On the other hand, for example, when an input video of a general aspect ratio is displayed at the center of the display without expanding the input video in the horizontal direction of the horizontally long display, large black belt portions are unavoidable on the left and right sides, and accordingly, the horizontally long display cannot be effectively used.

The present invention is contrived in consideration of the above-described problems, and an object thereof is to provide a video processing device capable of displaying an easily viewable video by utilizing a broader area in a display in a case where the aspect ratios of an input video and the display are different from each other.

Solution to Problem

In order to solve the above-described conventional problems, a video processing device according to the present invention is configured to include a video processing unit that processes an input video. The video processing unit is configured to include a first memory that stores the input video, a second memory that stores the input video, a compression/expansion control unit that compresses and/or expands a first area of the input video stored in the first memory and compresses and/or expands a second area of the input video stored in the second memory, and an image composing unit that generates an output video in which a video of the first area compressed and/or expanded by the compression/expansion control unit and a video of the second area compressed and/or expanded by the compression/expansion control unit are horizontally aligned.

In addition, according to another aspect of the present invention, there is provided a video display system, and this video display system includes one of the above-described video processing devices and a display that displays an output video.

Advantageous Effects of Invention

According to the present invention, first and second areas of an input video are displayed to be aligned in the row direction, and accordingly, an easily viewable video can be displayed by utilizing a broader area of a horizontally long display.

As described below, there is another aspect in the present invention. Thus, the disclosure of this invention is for purposes of providing a part of the present invention but not for purposes of limiting the scope of the invention that is described and claimed here.

BRIEF DESCRIPTION OF DRAWINGS

FIG. 18(a) is a diagram that illustrates an input video according to a first modified example of the fifth embodiment of the present invention.

FIG. 18(b) is a diagram that illustrates an output video according to the first modified example of the fifth embodiment of the present invention.

DESCRIPTION OF EMBODIMENTS

Figure 1:
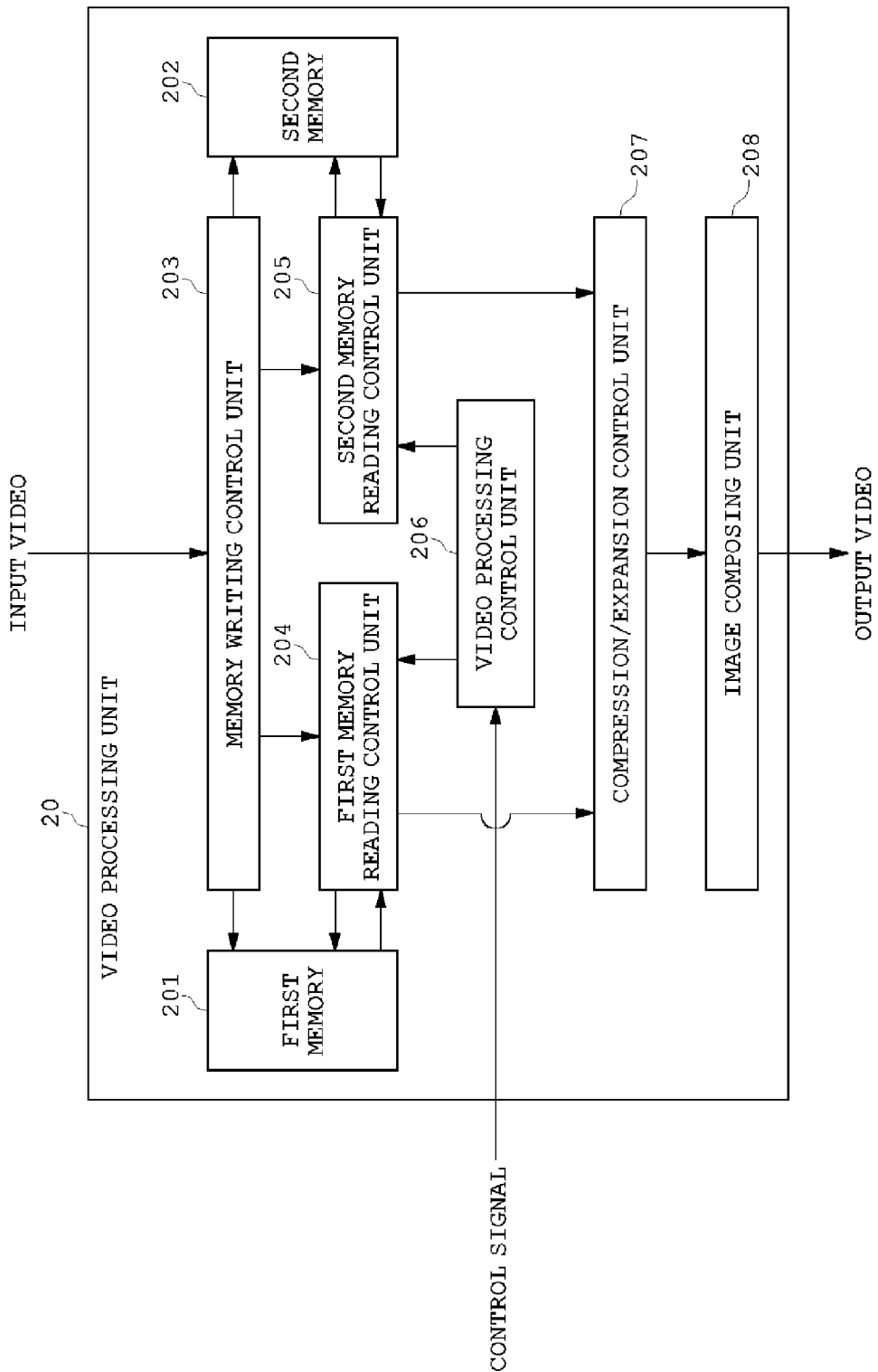
FIG. 1 is a block diagram that illustrates the configuration of a video processing unit of a video processing device according to a first embodiment of the present invention.

Hereinafter, detailed description of the present invention will be presented. Embodiments described below are merely examples of the present invention, and the present invention may be changed to various forms. Thus, specific configurations and specific functions disclosed below are not for purposes of limiting the claims.

A video processing device according to an embodiment of the present invention is configured to include a video processing unit that processes an input video. The video processing unit is configured to include a first memory that stores the input video, a second memory that stores the input video, a compression/expansion control unit that compresses and/or expands a first area of the input video stored in the first memory and compresses and/or expands a second area of the input video stored in the second memory, and an image composing unit that generates an output video in which a video of the first area compressed and/or expanded by the compression/expansion control unit and a video of the second area compressed and/or expanded by the compression/expansion control unit are horizontally aligned.

According to such a configuration, the input video is stored in both the first memory and the second memory, an output video in which the first and second areas of the input video are horizontally aligned is generated by reading the first area from the first memory and compressing and/or expanding the first area and reading the second area from the second memory and compressing and/or expanding the second area. Accordingly, when the input video is directly displayed in a case where a display is horizontally longer than the input video, black belt portions in which no video is included are generated to the left and right sides of the input video, and, according to such a configuration, the first and second areas are displayed by being aligned in the row direction, whereby an easily viewable video can be displayed by utilizing a broader area in the horizontally long display.

In addition, in the above-described video processing device, the first area may be an upper area of the input video, and the second area may be a lower area of the input video.

According to such a configuration, a vertically divisible input video is vertically divided, and the divided videos are compressed and/or expanded and then can be displayed to be aligned in the row direction.

In addition, in the above-described video processing device, the first area may be the entire area of the input video, and the second area may be a rectangular area of the input video that is smaller than the entire area.

According to such a configuration, a partial area (rectangular area) extracted from the input video is enlarged and can be displayed by being aligned together with the input video.

In addition, the above-described video processing device may further include a division control unit that determines whether or not a display can be made in a division display mode in which the output video generated by the image composing unit is displayed and controls the video processing unit.

According to such a configuration, in a case where the input video is a video that can be displayed in the division display mode, the output video is generated in which the first and second areas of the input video are horizontally aligned. Here, whether or not the input video is a video that can be displayed in the division display mode may be determined based on the content of the input video or may be determined based on a user's instruction.

In addition, in the above-described video processing device, the division control unit may determine whether the input video is a vertically divided video and, in a case where the input video is the vertically divided video, control the video processing unit so as to generate an output video for performing a display in the division display mode with an upper area set as the first area and a lower area set as the second area.

According to such a configuration, when the input video is a vertically divided video, an output video is automatically generated in which the upper area and the lower area are horizontally aligned.

In addition, in the above-described video processing device, the division control unit may determine whether the input video is a vertically divided video and, in a case where the input video is the vertically divided video, add a division display mode in which the output video generated by the image composing unit is displayed as a display mode and control the video processing unit so as to generate an output video for performing a display in the division display mode with the upper area set as the first area and the lower area set as the second area when the division display mode is selected by a user.

According to such a configuration, when the input video is a vertically divided video, a user can direct to generate an output video in which the upper area and the lower area are horizontally aligned.

In addition, in the above-described video processing device, the division control unit may control the video processing unit so as to generate an output video for performing a display in the division display mode with an area disposed on an upper side of a division position set as the first area and an area disposed on a lower side of the division position set as the second area in accordance with a user's instruction including designation of the division position used for vertically dividing the input video.

According to such a configuration, the user can direct to vertically divide the input video at the division position and generate an output video in which the upper area and the lower area are horizontally aligned.

In addition, in the above-described video processing device, the division control unit may detect a face area from the input video and control the video processing unit so as to generate an output video for performing a display in the division display mode with the entire area of the input video set as the first area and the face area set as the second area when the face area is detected from the input video.

According to such a configuration, when there is a person's face in the input video, an output video in which the entire area and the face area of the input video are horizontally aligned is automatically generated.

In addition, in the above-described video processing device, the division control unit may detect a face area from the input video, when the face area is detected from the input video, add a division display mode in which the output video generated by the image composing unit is displayed as a display mode, and control the video processing unit so as to generate an output video for performing a display in the division display mode with the entire area of the input video set as the first area and the face area set as the second area when the division display mode is selected by a user.

According to such a configuration, when there is a person's face in the input video, the user can direct to generate an output video in which the entire area and the face area of the input video are horizontally aligned.

In addition, in the above-described video processing device, the division control unit may control the video processing unit so as to generate an output video for performing a display in the division display mode with the entire area of the input video set as the first area and a partial area set as the second area in accordance with a user's instruction including designation of the partial area of the input video.

According to such a configuration, the user can designate an arbitrary area of the input video and direct to generate an output video in which the designated area of the input video and the entire area of the input video are horizontally aligned.

In addition, according to another aspect of the present invention, there is provided a video display system, and this video display system is configured to include one of the above-described video processing devices and a display that displays an output video.

According to such a configuration, since the first and second areas are displayed by being aligned in the row direction, an easily viewable video can be displayed by utilizing a broader area in the horizontally long display.

Hereinafter, embodiments of the present invention will be described with reference to the drawings.

First Embodiment

Figure 2:
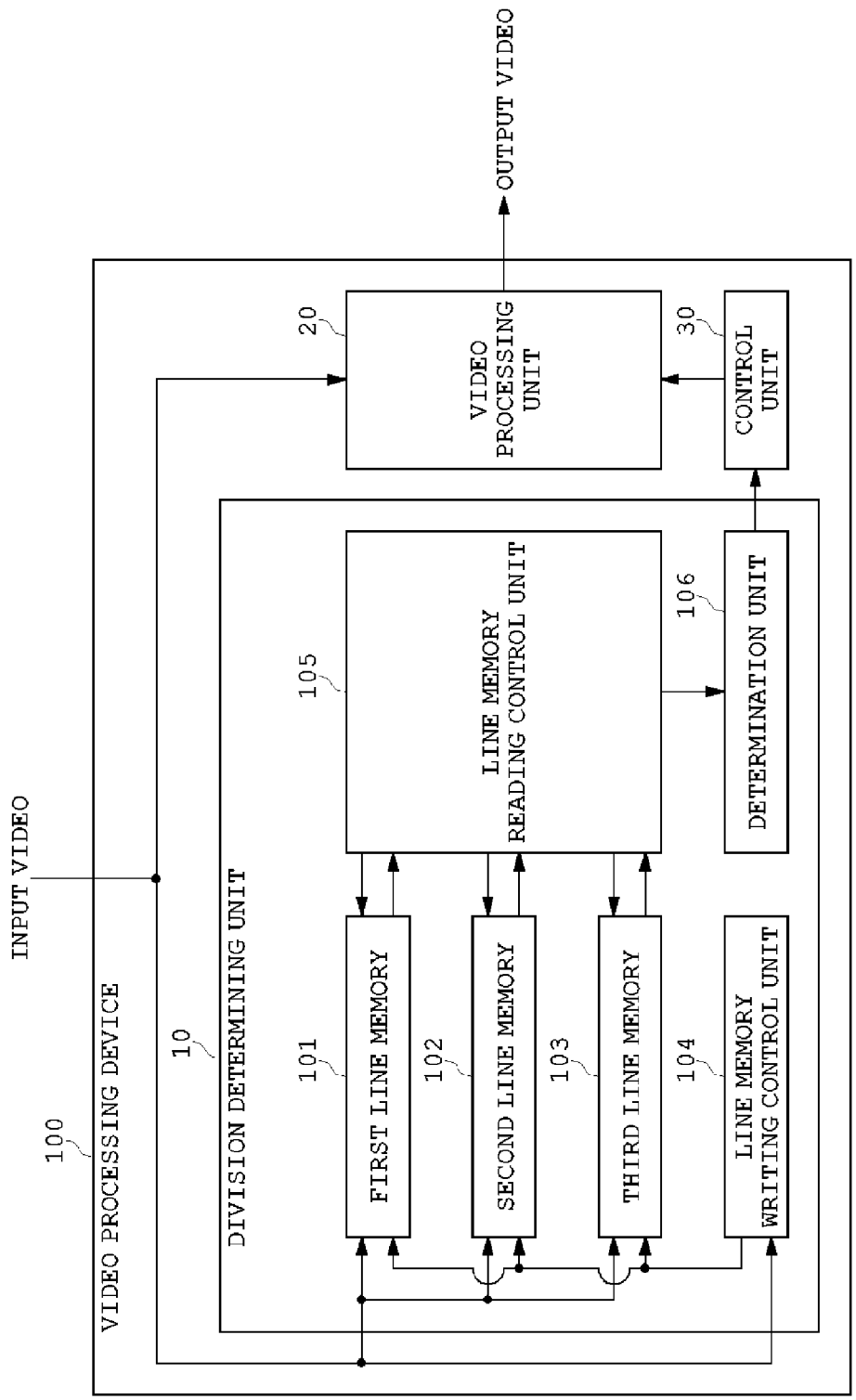
FIG. 2 is a block diagram that illustrates the configuration of the video processing device according to the first embodiment of the present invention.

FIG. 1 is a block diagram that illustrates the configuration of a video processing unit of a video processing device according to a first embodiment of the present invention. FIG. 2 is a block diagram that illustrates the configuration of the video processing device according to the first embodiment of the present invention. First, the entire configuration of the video processing device will be described with reference to FIG. 2, and then, the configuration of the video processing unit of the video processing device will be described in detail with reference to FIG. 1.

As display modes, a video processing device 100 according to this embodiment has a normal display mode in which an input video is directly displayed without changing the aspect ratio thereof and a vertical division display mode, as described in this embodiment, in which an input video is divided into an upper area and a lower area, and videos of the areas are horizontally aligned to be displayed, further has a display mode such as a full-screen display mode in which an input video is compressed and/or expanded in accordance with the size of a display, and processes the input video in accordance with the display mode. Here, the vertical division display mode is one kind of a division display mode according to the present invention. In the first embodiment, the configuration of the video processing device 100 for displaying a video in the vertical division display mode will be described.

The video processing device 100 according to this embodiment divides an input video as illustrated in FIG. 10(a) into an upper area and a lower area, compresses and/or expands the videos of the areas in the vertical and/or horizontal directions, and horizontally aligns the videos of the areas as illustrated in FIG. 10(b), thereby generating an output video displayed in the entire area of a display. The display is connected to the video processing device 100 according to this embodiment. The output video generated by the video processing device 100 is input to the display. A video display system according to the present invention is configured by the video processing device 100 and the display. Here, as the display, a known display may be used.

As illustrated in FIG. 2, the video processing device 100 according to this embodiment includes a division determining unit 10, a video processing unit 20, and a control unit 30. A configuration acquired by combining the division determining unit 10 and the control unit 30 corresponds to a division control unit according to the present invention. The division determining unit 10 determines whether or not an input video is a video that can vertically divide the screen, as illustrated in FIG. 10(a). The division determining unit 10 includes a first line memory 101, a second line memory 102, a third line memory 103, a line memory writing control unit 104, a line memory reading control unit 105, and a determination unit 106.

An input video is input to the first line memory 101, the second line memory 102, the third line memory 103, and the line memory writing control unit 104. The line memory writing control unit 104 writes each line of a video signal into one of the first, second, third line memories 101, 102, and 103 by supplying write signals to the first, second, and third line memories 101, 102, and 103 based on the input video. The line memory into which the video signal is to be written is selected in order of the first, second, and third line memories 101, 102, and 103 for each line.

The line memory reading control unit 105 reads signals from two line memories acquired by excluding a line memory into which the video signal is written under the control of the line memory writing control unit 104 from the first, second, and third line memories 101, 102, and 103 and outputs the read signals to the determination unit 106.

The determination unit 106 determines whether or not the video signal of two lines read by the line memory reading control unit 105 is a video signal of a vertical division position of the screen. More specifically, the determination unit 106 determines whether or not the two lines are two lines exceeding the vertical division position (the boundary between upper and lower screens) in accordance with determination conditions based on the magnitude of a change in the video signal of the two lines read by the line memory reading control unit 105. The determination conditions are as follows.

(Determination Condition 1)

Determination Condition 1 is a condition that the positions of two lines satisfying the following boundary condition are in an area within several lines near the center of the screen in the vertical direction. As the boundary condition, for example, one of the following conditions (1) to (5) as below may be employed.

(1) A sum of differences between luminance levels of pixels disposed in a column corresponding to the video signal of the two lines is a maximum or within the fifth in the frame of the video signals.

(2) A sum of the absolute values of differences between luminance levels of pixels disposed in a column corresponding to the video signal of the two lines is a maximum or within the fifth in the frame of the video signals.

(3) A sum of differences between the chromaticity levels of pixels disposed in a column corresponding to the video signal of two lines is a maximum or within the fifth in the frame of the video signals.

(4) A sum of the absolute values of differences between the chromaticity levels of pixels disposed in a column corresponding to the video signal of the two lines is a maximum or within the fifth in the frame of the video signals.

(5) At least one line of the two lines is a black belt area.

In addition, the boundary condition may be a condition that is acquired by arbitrarily combining the conditions (1) to (4) described above.

In a case where the determination unit 106 makes a determination using Determination Condition 1, the determination does not necessary need to be made for all the two lines, which are adjacent to each other, of the video signal, and the determination may be made only for two lines adjacent to each other that are located near the center in the vertical direction. In addition, the determination may be made only for positions located near the center of two lines adjacent to each other in the horizontal direction, or the determination may be made only for positions located near the center of two lines, which are adjacent to each other located near the center in the vertical direction, in the horizontal direction.

(Determination Condition 2)

Determination Condition 2 is a condition that the amount of change in luminance exceeds a predetermined threshold within several lines located near the center of the screen in the vertical direction. As the amount of change in luminance, for example, one of the following amounts (1) to (4) may be used.

(1) A sum of differences between luminance levels of pixels disposed in a column corresponding to the video signal of two lines (2) A sum of the absolute values of differences between luminance levels of pixels disposed in a column corresponding to the video signal of two lines (3) A sum of differences between chromaticity levels of pixels disposed in a column corresponding to the video signal of two lines (4) A sum of the absolute values of differences between chromaticity levels of pixels disposed in a column corresponding to the video signal of two lines In addition, in Determination Conditions 1 and 2 described above, the sum of differences between luminance levels of pixels disposed in a column corresponding to the video signal of two lines, the sum of the absolute values of differences between luminance levels of pixels disposed in a column corresponding to the video signal of two lines, the sum of differences between chromaticity levels of pixels disposed in a column corresponding to the video signal of two lines, and the sum of the absolute values of differences between chromaticity levels of pixels disposed in a column corresponding to the video signal of two lines may be a sum for pixels of all the columns of the two lines or, for example, may be a sum for pixels of columns extracted at the interval of several pixels.

The determination unit 106 determines whether or not the video signal of the two lines satisfies a determination condition each time when the video signal of two lines is read by the line memory reading control unit 105 by using the determination condition as described above.

Figure 3:
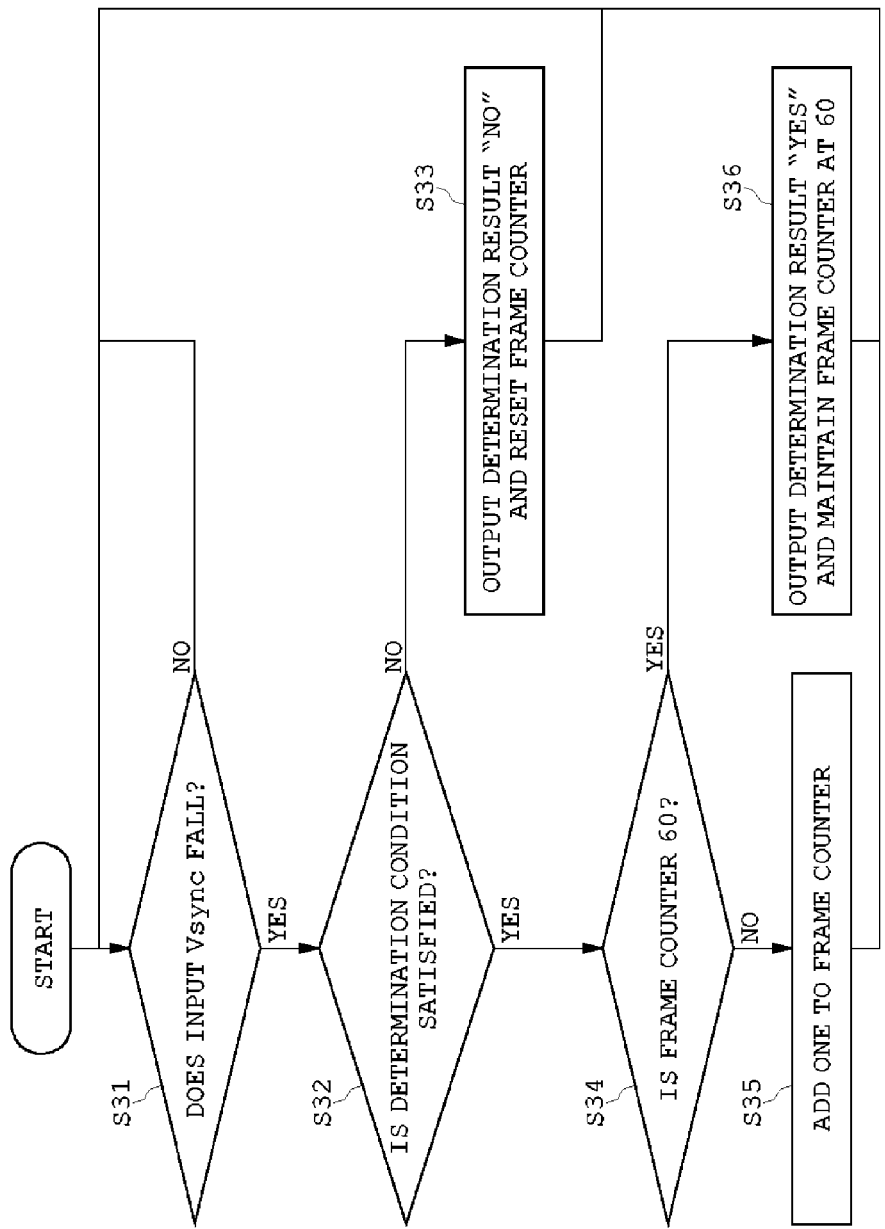
FIG. 3 is a flowchart that illustrates an example of a determination process performed by a division determining unit according to the first embodiment of the present invention.

FIG. 3 is a flowchart that illustrates an example of a division determination process performed by the determination unit 106. The determination unit 106 waits for a fall of an input vertical synchronization signal Vsync (Step S31) and determines whether or not the determination condition is satisfied (Step S32) when there is the fall (Yes in Step S31). In a case where the determination condition is not satisfied (No in Step S32), "No" is output as a result of the determination, and a frame counter is reset (Step S33).

On the other hand, in a case where the determination condition is satisfied (Yes in Step S32), it is determined whether or not the frame counter reaches at 60 (Step S34). In a case where the frame counter has not reached at 60, the frame counter is incremented (Step S35), the process is returned to Step S31, and the determination unit waits for a fall of the input vertical synchronization signal again. On the other hand, in a case where frame counter reaches at 60 in Step S34 (Yes in Step S34), "Yes" is output as a result of the determination, the frame counter is maintained at 60 (Step S36), the process is returned to Step S31, and the determination unit waits for a fall of the next input vertical synchronization signal.

As is apparent from the flowchart illustrated in FIG. 3, in a case where the determination condition is satisfied consecutively for 60 frames, the determination unit 106 determines that the input video is vertically divisible and outputs "Yes" as a result of the determination, that is, a determination result representing that the input video is vertically divisible. As above, by outputting the determination result of "Yes" only in a case where the condition is satisfied consecutively for a plurality of frames, it is prevented that an input video that is not originally vertically divisible is erroneously determined as a vertically divisible video as the input video incidentally satisfies the determination condition.

In addition, as is apparent from FIG. 3, after the determination result of "Yes" is output, the frame counter is maintained at 60, and accordingly, as long as the determination condition is consecutively satisfied, it is Yes in Step S32, and it is Yes in Step S34, whereby the determination result of "Yes" is continuously output. When the input video is not vertically divisible, the determination condition is not satisfied in Step S32, the frame counter is reset in Step S33, and a determination result of "Yes" is not output until the determination condition is satisfied consecutively for 60 frames again. Here, the number of frames for determining "Yes" is not limited to 60 and, for example, may be 30, 120, or the like.

Figure 4:
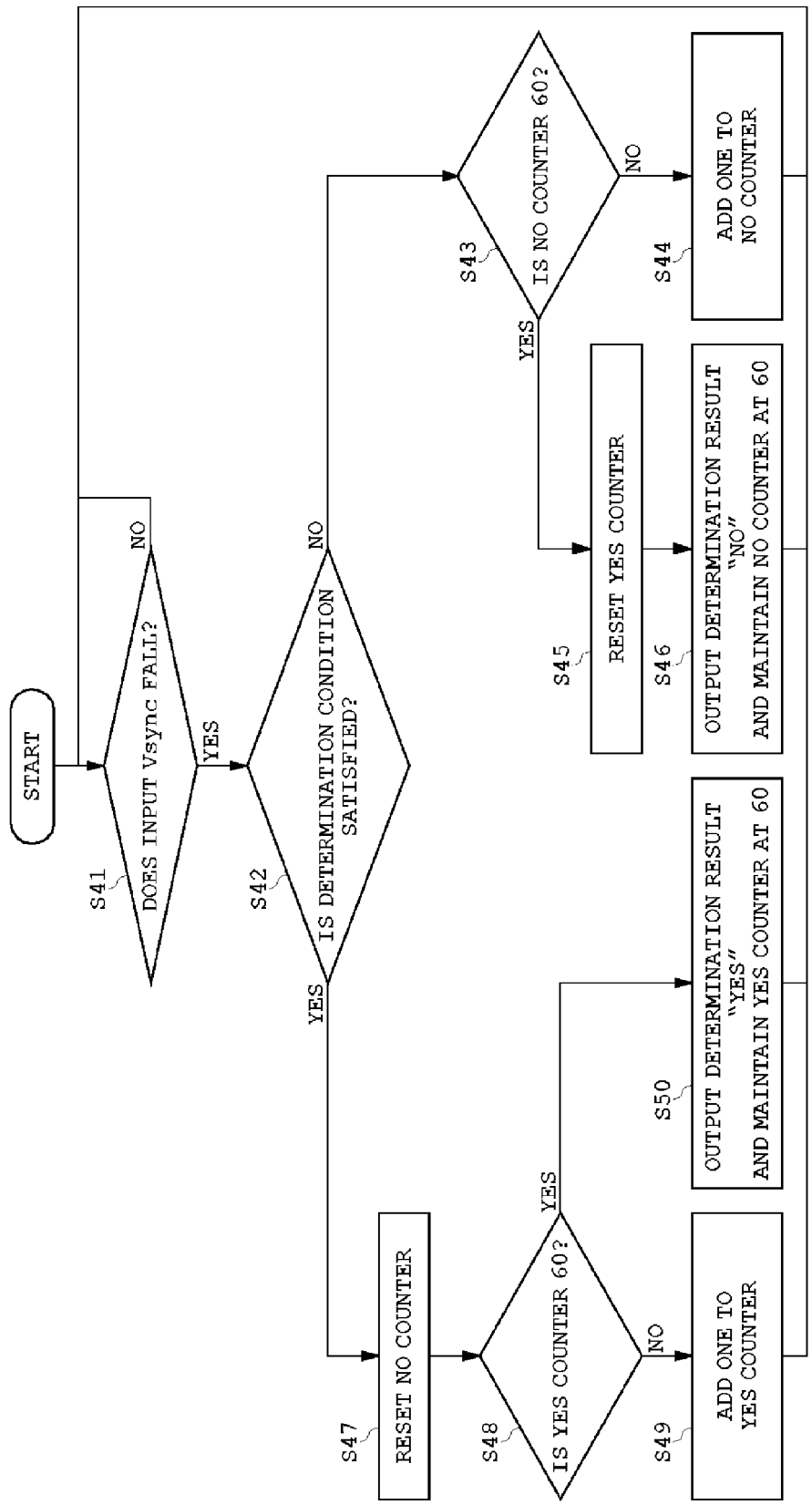
FIG. 4 is a flowchart that illustrates another example of the determination process performed by the division determining unit according to the first embodiment of the present invention.

FIG. 4 is a flowchart that illustrates another example of the division determination process performed by the determination unit 106. The determination unit 106 waits for a fall of the input vertical synchronization signal Vsync (Step S41) and determines whether or not the determination condition is satisfied (Step S42) when there is the fall (Yes in Step S41). In a case where the determination condition is not satisfied (No in Step S42), it is determined whether a No counter reaches at 60 (Step S43). In a case where the No counter has not reached at 60 (No in Step S43), the No counter is incremented (Step S44), the process is returned to Step S41, and the determination unit waits for a fall of the next input vertical synchronization signal.

In a case where the No counter reaches at 60 in Step S43 (Yes in Step S43), a Yes counter is reset (Step S45), "No" is output as a result of the determination, the No counter is maintained at 60 (Step S46), the process is returned to Step S41, and the determination unit waits for a fall of the next input vertical synchronization signal.

On the other hand, in a case where the determination condition is satisfied in Step S42 (Yes in Step S42), the No counter is reset (Step S47), and it is determined whether or not the Yes counter has reached at 60 (Step S48). In a case where the Yes counter has not reached at 60 (No in Step S48), the Yes counter is incremented (Step S49), the process is returned to Step S41, and the determination unit waits for a fall of the next input vertical synchronization signal. On the other hand, the Yes counter has reached at 60 in Step S48 (Yes in Step S48), "Yes" is output as a result of the determination, the Yes counter is maintained at 60 (Step S50), the process is returned to Step S41, and the determination unit waits for a fall of the next input vertical synchronization signal.

As above, in the example illustrated in FIG. 4, a determination result of "Yes" is output when the determination condition is satisfied consecutively for a predetermined number of frames (60 frames), and the determination result of "No" is output when the determination condition is not satisfied consecutively for a predetermined number of frames (60 frames).

In addition, in the above-described flow, while the No counter is immediately reset in Step S47 when there is a frame satisfying the determination condition in Step S42, the Yes counter is not reset until the No counter reaches at 60 even in a case where there is a frame not satisfying the determination condition in Step S42.

The reason for this is that there is a case where there is incidentally a frame not satisfying the determination condition during an operation after a determination of "Yes", and a determination result of "No" should not be output for such a frame. Accordingly, as in the flowchart illustrated in FIG. 3, the Yes counter is reset (Step S45) only in a case where there are a plurality of consecutive frames (60 frames) not satisfying the determination condition (Yes in Step S43), and, as a result of the determination, "No" is output (Step S46).

In a case where the determination result is "Yes", the determination unit 106 outputs information of a division position (more specifically, information representing the row of a line vertically dividing the screen) to the control unit 30 as a result of the determination together with the determination result of "Yes" (in the case of the example illustrated in FIG. 3) or a determination result of "Yes" or "No" (in the case of the example illustrated in FIG. 4).

Referring to FIG. 2, the control unit 30 outputs a control signal to the video processing unit 20 based on a determination result input from the determination unit 106. In a case where a division display is performed, the information of the division position included in the determination result supplied from the division determining unit 10 is included in the control signal together with information representing whether or not a division display is performed (whether the vertical division display mode is set). To the video processing unit 20, an input video to be processed and the control signal supplied from the control unit 30 are input, and the video processing unit 20 processes the input video and outputs an output video to the display based on the control signal.

Figure 5:
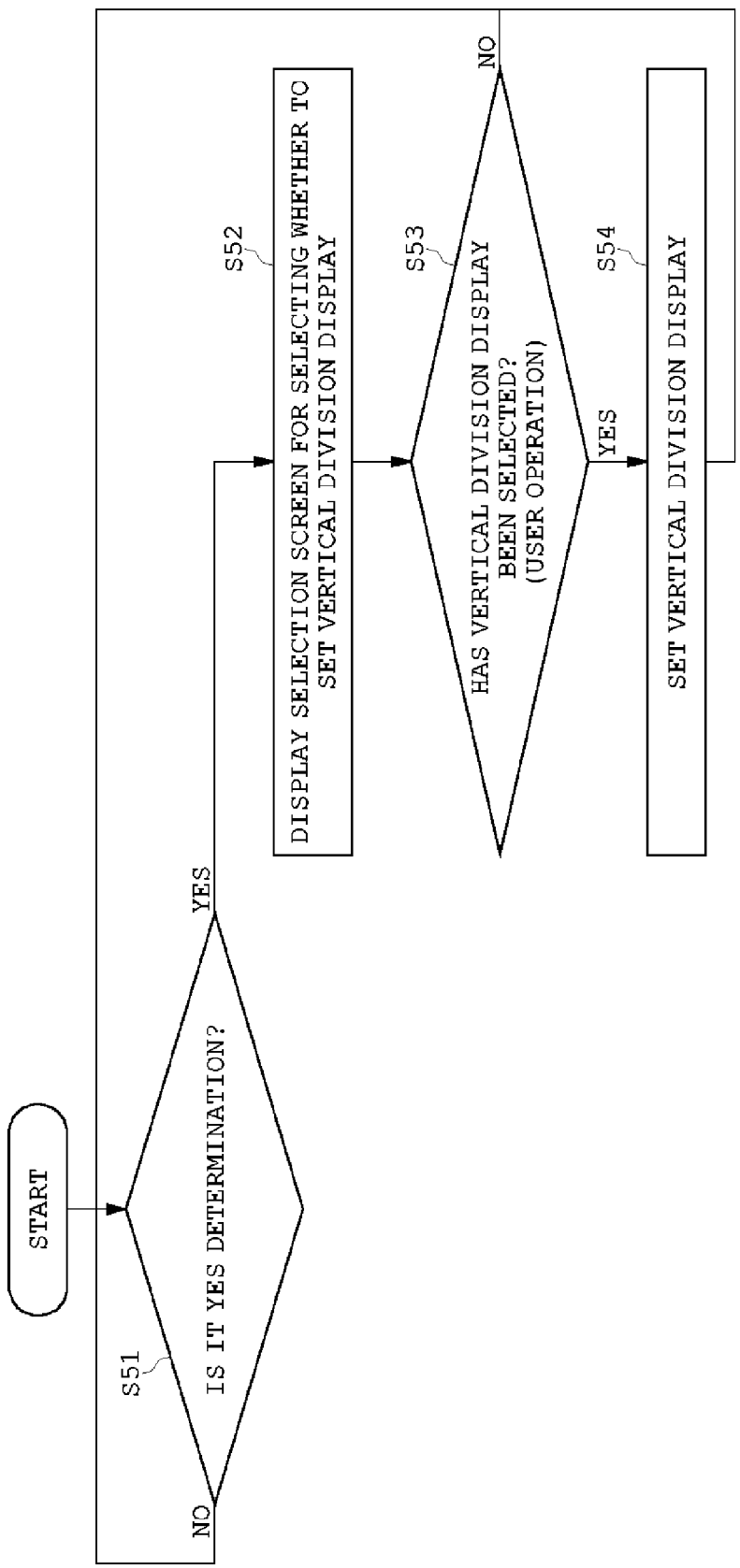
FIG. 5 is a flowchart that illustrates an example of a control process performed by a control unit according to the first embodiment of the present invention.

FIG. 5 is a flowchart that illustrates an example of the process of controlling the video processing unit 20 that is performed by the control unit 30. The example illustrated in FIG. 5 illustrates the process of the control unit 30 in a case where only "Yes" is output as a determination result, as in the example illustrated in FIG. 3, in the determination process of the determination unit 106.

First, the control unit 30 determines whether or not the determination result supplied from the determination unit 106 is "Yes" (Step S51). In a case where the determination result is "Yes" (Yes in Step S51), a selection screen used for selecting whether to perform a vertical division display is displayed on the display (Step S52), and waiting for a user's selection operation being performed (Step S53). In a case where the vertical division display is selected by the user (Yes in Step S53), a control signal is output to the video processing unit 20, video processing for the vertical division display is performed (Step S54), and the process is returned to Step S51.

In addition, after the vertical division display is performed, for example, the screen is returned to a normal screen that is not vertically divided in accordance with a user's operation such as a mode switching operation. As above, in the example illustrated in FIG. 5, in a case where the input video is a vertically divisible video, first, a user is allowed to select whether or not a vertical division display is performed, and the vertical division display is performed in accordance with a user's operation.

Figure 6:
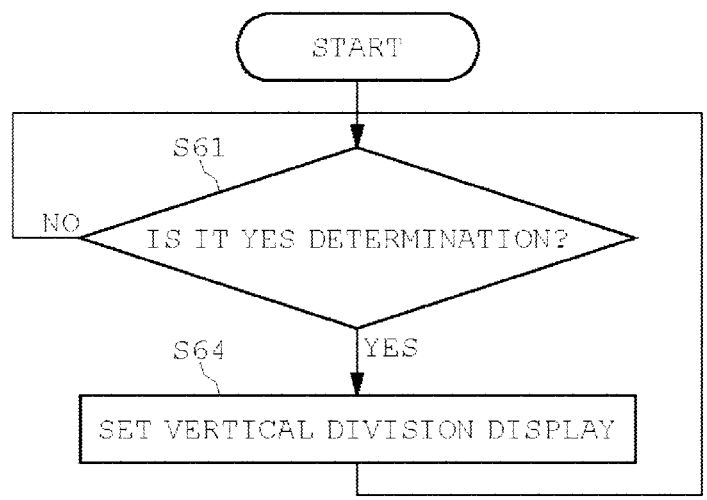
FIG. 6 is a flowchart that illustrates another example of the control process performed by the control unit according to the first embodiment of the present invention.

FIG. 6 is a flowchart that illustrates another example of the process of controlling the video processing unit 20 that is performed by the control unit 30. The example illustrated in FIG. 6 is an exemplary modification of the example illustrated in FIG. 5. In this example, it is determined whether or not the determination result supplied from the determination unit 106 is "Yes" (Step S61). In a case where the determination result is "Yes" (Yes in Step S61), a vertical division display is automatically performed (Step S64) without inquiring the user whether to perform a vertical division display unlike the example illustrated in FIG. 5.

In this example, the user does not need to perform an instruction operation for performing a vertical division display. In addition, unlike the example illustrated in FIG. 5, the configuration for displaying a selection screen is unnecessary, whereby the configuration of the video processing device 100 can be simplified.

Figure 7:
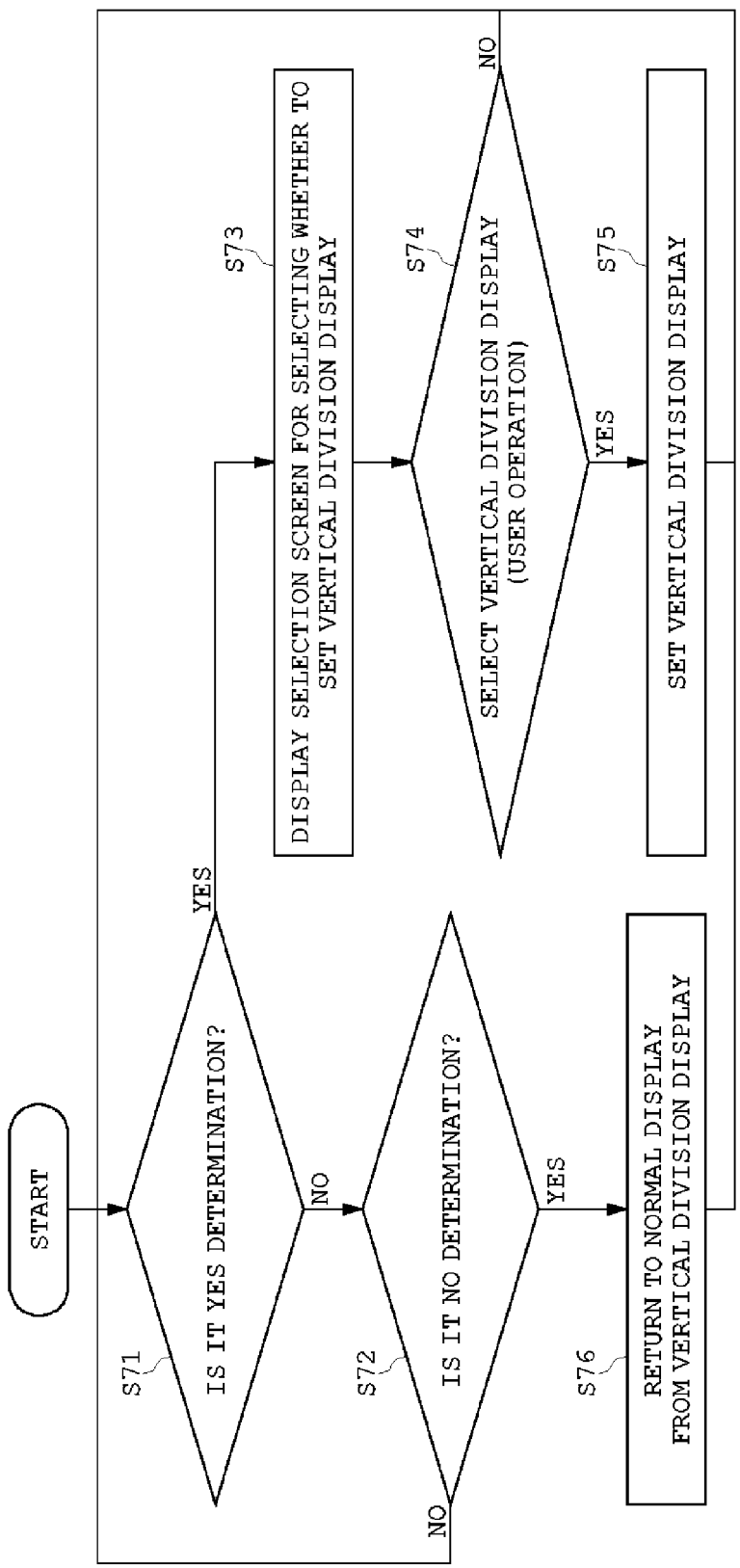
FIG. 7 is a flowchart that illustrates another example of the control process performed by the control unit according to the first embodiment of the present invention.

FIG. 7 is a flowchart that illustrates another example of the process of controlling the video processing unit 20 that is performed by the control unit 30. The example illustrated in FIG. 7 illustrates the process of the control unit 30 in a case where the determination unit 106 outputs "Yes" and "No" as determination results as in the example illustrated in FIG. 4.

The control unit 30 determines whether the determination result supplied from the determination unit 106 is "Yes" (Step S71) or "No" (Step S72), and this is repeated until either determination result is acquired.

When the determination result is output from the determination unit 106 and is "Yes" (Yes in Step S71), similarly to the example illustrated in FIG. 5, a selection screen for selecting whether to perform a vertical division display is displayed on the display (Step S74), waiting for a user's selection operation is performed (Step S74), and, in a case where the user selects the vertical division display (Yes in Step S74), a control signal is output to the video processing unit 20, whereby video processing for the vertical division display is performed (Step S75). On the other hand, when the determination result is output from the determination unit 106 and is "No" (Yes in Step S72), the vertical division display is returned to a normal display (Step S76).

In other words, while the switching from the vertical division display to the normal display is performed based on a user's operation in the example illustrated in FIG. 5, in the example illustrated in FIG. 7, the switching is automatically performed by the control unit 30 based on the determination result of "No" output from the determination unit 106. In addition, when the display is returned from the vertical division display to the normal display, similarly to Steps S73 and S74, a selection screen may be displayed, and the switching between the displays may be performed waiting for a user's operation.

Figure 8:
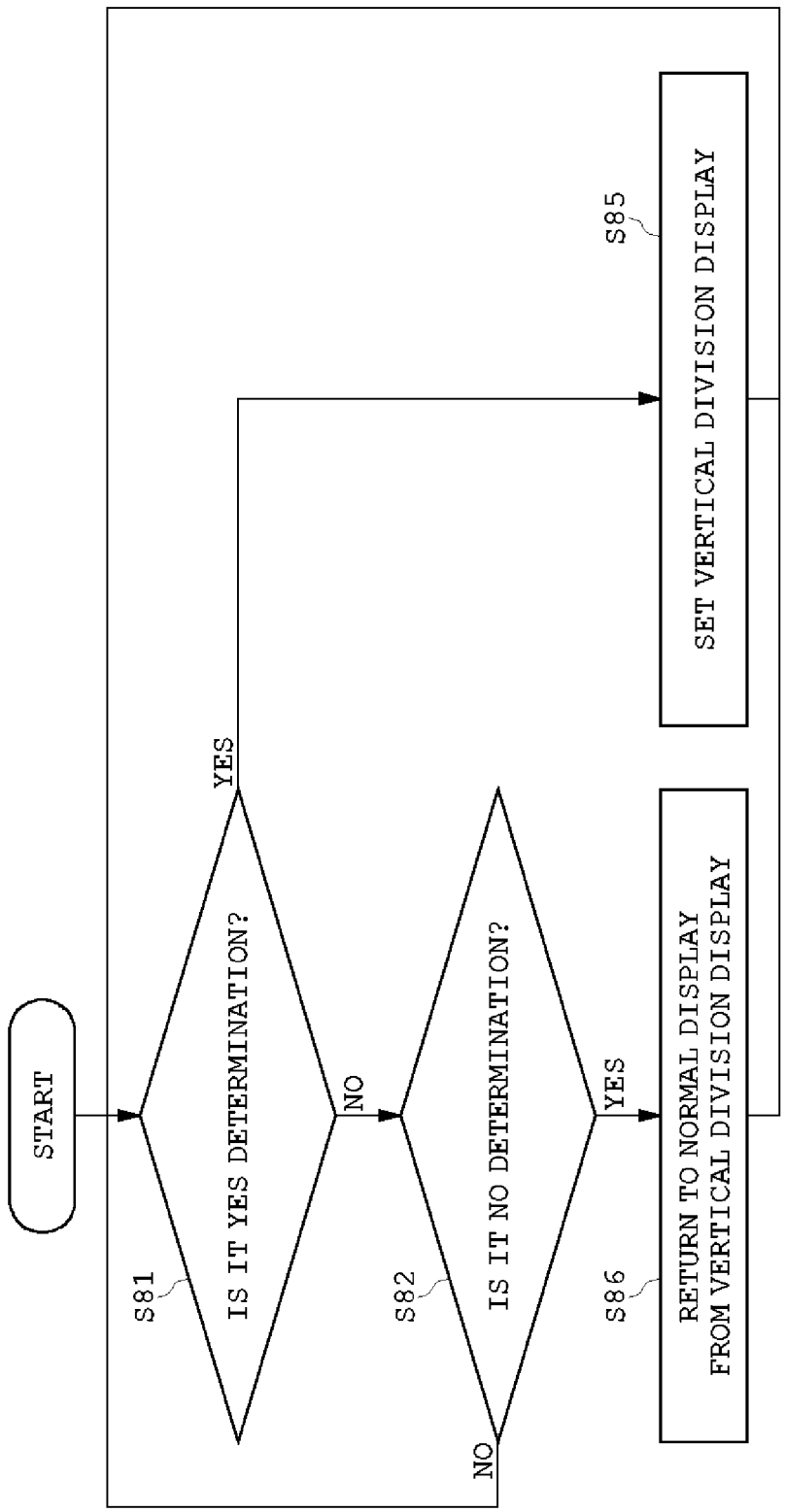
FIG. 8 is a flowchart that illustrates another example of the control process performed by the control unit according to the first embodiment of the present invention.

FIG. 8 is a flowchart that illustrates another example of the process of controlling the video processing unit 20 that is performed by the control unit 30. The example illustrated in FIG. 8 is an exemplary modification of the example illustrated in FIG. 7. In this example, in a case where a determination result of "Yes" is supplied from the determination unit 106 (Yes in Step S81), as the example illustrated in FIG. 7, a vertical division display is automatically performed without inquiring the user whether to perform the vertical division display (Step S85). In addition, in a case where a determination result of "No" is supplied from the determination unit 106 (Yes in Step S82), the display is returned from the division display to the normal display (Step S85).

Figure 9:
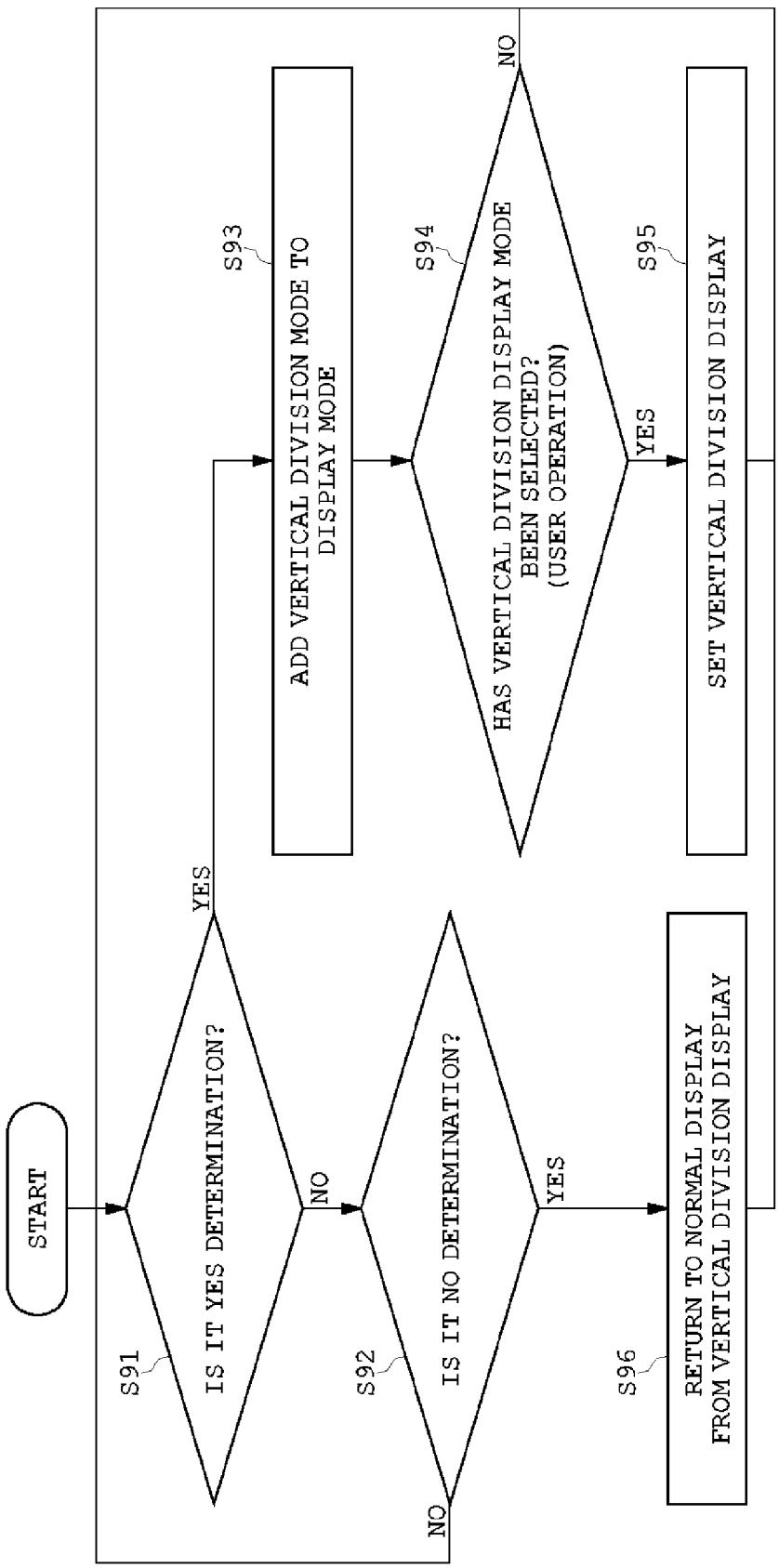
FIG. 9 is a flowchart that illustrates another example of the control process performed by the control unit according to the first embodiment of the present invention.

FIG. 9 is a flowchart that illustrates another example of the process of controlling the video processing unit 20 that is performed by the control unit 30. In the example illustrated in FIG. 9, the video processing device 100 normally has a normal display mode and a full-screen display mode as display modes, and, when an input video is determined as a vertically divisible video by the division determining unit 10 (when the determination unit 106 outputs a determination result of "Yes"), a vertical division display mode is added to the display modes.

In other words, in FIG. 9, when a determination result of "Yes" is supplied in Step S91, a vertical division display mode is added to the display modes in Step S93, and, when a user selects the vertical division display mode as the display mode in Step S94 (Yes in Step S94), the control unit 30 outputs a control signal used for performing the vertical division display. In the example illustrated in FIG. 9, the other processes are the same as those of FIG. 7.

Next, the configuration of the video processing unit 20 will be described with reference to FIG. 1. Hereinafter, an example of the process will be described in which a video illustrated in FIG. 10(a) is given as an input video, the video is divided into an upper area and a lower area, the video of each area is compressed and/or expanded in the vertical and/or horizontal directions, and, as illustrated in FIG. 10(b), an output video displayed using the whole screen by horizontally aligning the videos of the areas is generated. The aspect ratio of the input video illustrated in FIG. 10(a) is 16:9.

In FIG. 10(a), the videos of the upper and lower areas are separated at the center in the vertical direction of the screen, in other words, a vertical division position is the center in the vertical direction of the screen. Accordingly, the aspect ratio of the videos of the upper and lower areas is 16:4.5. The aspect ratio of the output video illustrated in FIG. 10(b) is 30:9. The aspect ratio of each one of videos of the areas disposed on the left and right sides of a horizontal division position in FIG. 10(b) is 15:9.

As illustrated in FIG. 1, the video processing unit 20 includes a first memory 201, a second memory 202, a memory writing control unit 203, a first memory reading control unit 204, a second memory reading control unit 205, a video processing control unit 206, a compression/expansion control unit 207, and an image composing unit 208.

The memory writing control unit 203 writes an input video into the first and second memories 201 and 202. In both the first and second memories 201 and 202, pixel data of all the lines of the input video is written. A control signal representing a vertical division position of the screen that has been determined by the determination unit 106 is input to the video processing control unit 206. The video processing control unit 206 controls the first and second memory reading control units 204 and 205 in accordance with this control signal.

The first memory reading control unit 204 reads image data from the first memory 201 and outputs the read image data to the compression/expansion control unit 207 under the control of the video processing control unit 206. The second memory reading control unit 205 reads image data from the second memory 202 and outputs the read image data to the compression/expansion control unit 207 under the control of the video processing control unit 206.

The video processing control unit 206 performs control of the first and second memory reading control units 204 and 205 such that video signals are read from the first memory 201 for lines up to the vertical division position of the screen that is represented by the control signal, and video signals are read from the second memory 202 for lines below the vertical division position of the screen that is represented by the control signal. At this time, at the timing when the first memory reading control unit 204 reads a line of a first-row of the video signal, the second memory reading control unit 205 reads a line of a first row (in the above-described example, 241st row) below the vertical division position of the screen.

The compression/expansion control unit 207 compresses and/or expands the signals read by the first memory reading control unit 204 in the vertical and/or horizontal directions and outputs resultant signals to the image composing unit 208. In this embodiment, the input video is vertically divided at the center in the vertical direction, and the video of each area is compressed and/or expanded in the vertical and horizontal directions, whereby the videos are composed as a left-right parallel screen using the whole screen. The compression/expansion control unit 207 compresses and/or expands videos of the upper and lower areas such that each one of the videos of the upper and lower areas has the size of one divided portion acquired by horizontally dividing the display unit 13 at the center in the horizontal direction.

Figure 10:
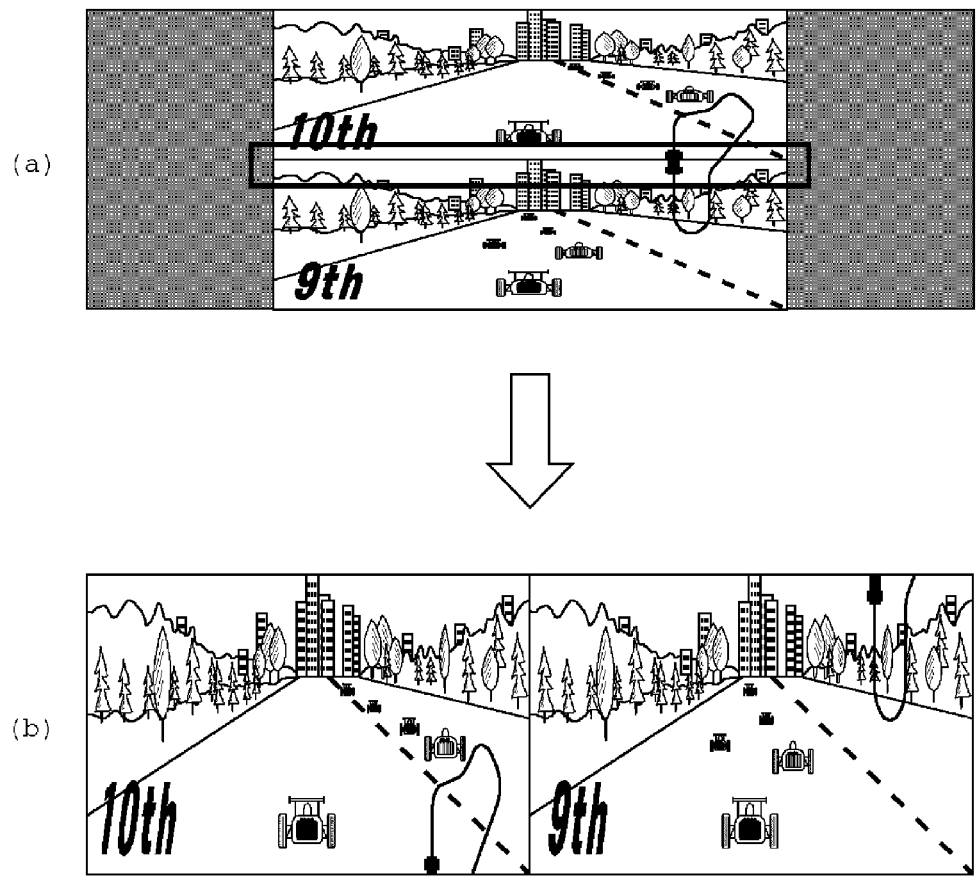
FIG. 10(a) is a diagram that illustrates an input video according to the first embodiment of the present invention.
FIG. 10(b) is a diagram that illustrates an output video according to the first embodiment of the present invention.

In the example illustrated in FIG. 10, the videos of the upper and lower areas are compressed and/or expanded such that the videos of the upper and lower areas each having an aspect ratio of 16:4.5 become videos each having an aspect ratio of 15:9. In the compression and/or expansion process, known technologies including interpolation and thinning out may be applied.

The image composing unit 208 composes data output from the compression/expansion control unit 207 for each line, thereby generating an output video. Accordingly, the video processing control unit 206 performs control of the first and second memory reading control units 204 and 205 such that video signals are read from the first memory 201 for rows disposed on the left side from the center of the output video, and video signals are read from the second memory 202 for rows disposed on the right side from the center of the output video. As a result, by the image composing unit 208, as illustrated in FIG. 10(b), lines generated by being read from the first memory 201 and being compressed and/or expanded by the compression/expansion control unit 207 are arranged on the left side from the screen center, and lines generated by being read from the second memory 202 and being compressed and/or expanded by the compression/expansion control unit 207 are arranged on the right side from the screen center. The image composing unit 208 outputs this video to the display as the output video.

As above, according to the video processing device 100 of the first embodiment, a vertically divisible input video is vertically divided, and divided videos are compressed and/or expanded and are horizontally displayed, whereby an easily viewable video can be displayed utilizing a broader area of the display. In addition, since the division determining unit 10 determines whether or not an input video is vertically divisible, the video processing device 100 can process and display the input video in the vertical division display mode based on the determination result.

In addition, in the above-described embodiment, in a case where the determination result is "Yes", although the determination unit 106 outputs the information of the division position together with the determination result indicating a display in the vertical division display mode, the determination unit 106 outputs only the determination result and does not need to output the division position in a case where it is known in advance that the videos of the upper and lower areas necessarily have the same size for the vertically divisible video.

Furthermore, in the above-described embodiment, although the division determining unit 10 determines whether or not the video signal is vertically divisible by comparing two upper and lower lines, the division determining unit 10, for example, may secure data of several lines and determine whether the video signal is vertically divisible by detecting a vertical division position by performing a high pass filtering process or may extract edges after the high pass filtering process and make the determination based on the amount of the edges.

In addition, in the above-described embodiment, although the division determining unit 10 determines whether or not a video signal is vertically divisible by comparing two upper and lower lines using three line memories, two upper and lower lines can be compared when there is at least one line memory. To the contrary, in a case where the division determining unit 10 detects a vertical division position by the high pass filtering process, four or more line memories may be included therein.

Second Embodiment

Figure 11:
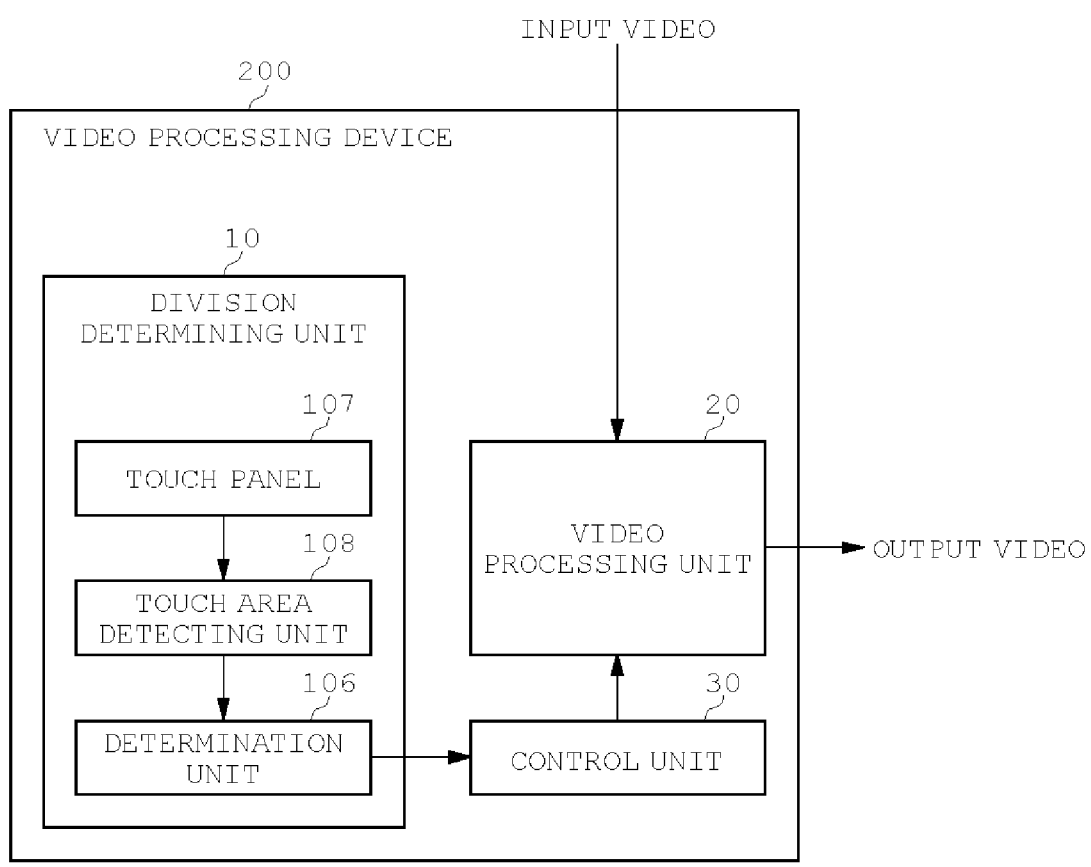
FIG. 11 is a block diagram that illustrates the configuration of a video processing device according to a second embodiment of the present invention.

FIG. 11 is a block diagram that illustrates the configuration of a video processing device according to a second embodiment of the present invention. In FIG. 11, the same reference numeral is assigned to each configuration corresponding to that of the video processing device according to the first embodiment. As illustrated in FIG. 11, the video processing device 200 according to this embodiment, similarly to the video processing device 100 according to the first embodiment, includes a division determining unit 10, a video processing unit 20, and a control unit 30. The division determining unit 10 according to this embodiment includes a touch panel 107, a touch area detecting unit 108, and a determination unit 106.

Figure 12:
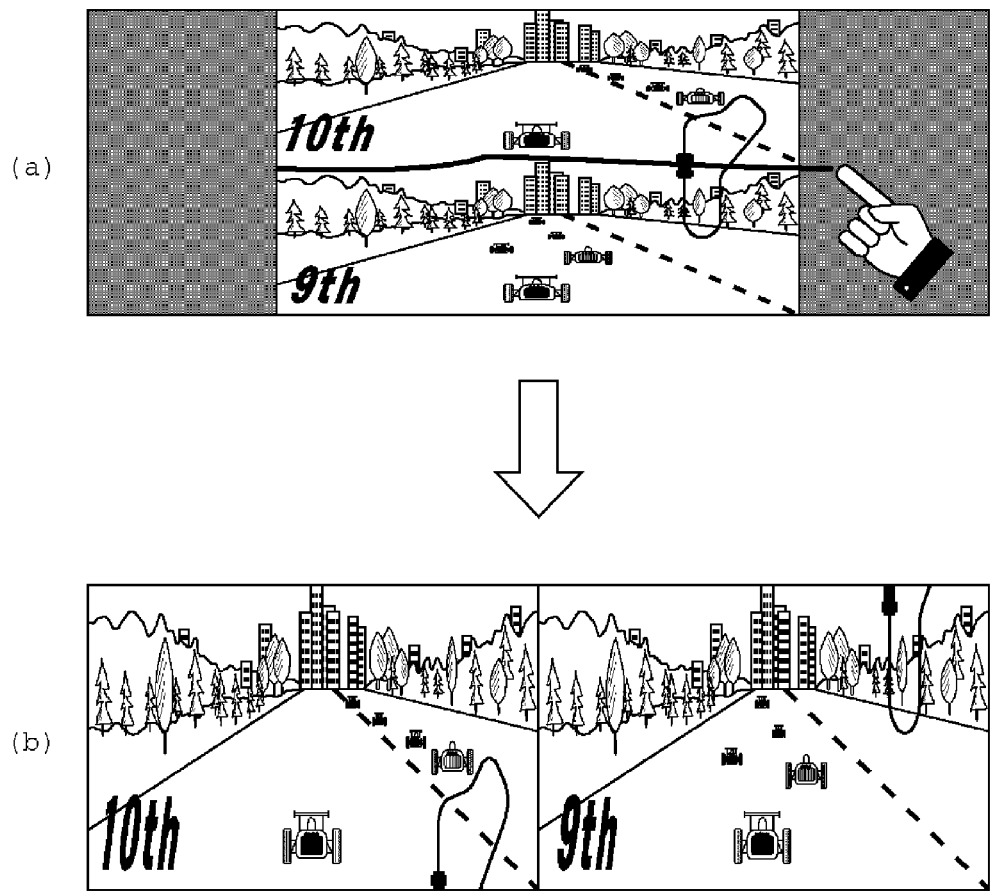
FIG. 12(a) is a diagram that illustrates an input video according to the second embodiment of the present invention.
FIG. 12(b) is a diagram that illustrates an output video according to the second embodiment of the present invention.

FIG. 12(a) is a diagram that illustrates a user's operation for a touch panel 107 so as to perform a division display in a vertical division display mode, and FIG. 12(b) is a diagram that illustrates a screen displayed in the vertical division display mode. The touch panel 107 is disposed on a display, detects a contact according to a person's finger or the like, and outputs a detection signal. The touch area detecting unit 108 receives a detection signal from the touch panel 107 as an input, detects a touch area, and outputs the touch area to the determination unit 106.

When the touch area is received from the touch area detecting unit 108, the determination unit 106 determines whether to perform a display in the vertical division display mode based on the touch area and outputs a determination result to the control unit 30. When a determination result indicating a display in the vertical division display mode is to be output, the determination unit 106 also outputs a division position as the determination result.

In a case where the touch area input from the touch area detecting unit 108 is a center portion of the screen in the vertical direction, and the operation is an operation drawing a horizontal line on the displayed video (the video is touched with a finger and is dragged) (in other words, a state as illustrated in FIG. 12(a)), the determination unit 106 outputs a determination result indicating a display in the vertical division display mode. At this time, the division position may be at an average height of the touch area, which has been detected by the touch area detecting unit 108, in the height direction.

In addition, in a case where it is known in advance that a video of the upper area and a video of the lower area for the vertically divisible video necessarily have the same size, when the touch area input from the touch area detecting unit 108 is located near the center in the vertical direction, the determination unit 106 may automatically regards the center in the vertical direction (in a case where there are 480 pixels in the vertical direction, between the 240th row and the 241st row) as the division position. As above, in a case where the division position is fixed, the determination unit 106 outputs only a determination result indicating a display in the vertical division display mode and does not need to output the division position.

The control unit 30 outputs a control signal used for performing a display in the vertical division display mode to the video processing unit 20 based on the determination result supplied from the determination unit 106. At this time, the control signal is output in accordance with the example illustrated in FIG. 6. In other words, in a case where a determination result indicating a display in the vertical division display mode is acquired from the determination unit 106, a control signal indicating a display in the vertical division display mode is immediately output to the video processing unit 20 together with a division position. At this time, the determination of performing a display in the vertical division display mode in the division determining unit 10 is made based on a user's operation, and accordingly, as in the examples illustrated in FIGS. 5, 7, and 9, the user does not need to perform an operation for performing a division display again. The configuration and the operation of the video processing unit 20 are the same as those of the first embodiment.

As above, according to the video processing device 200 of the second embodiment, the video is vertically divided at the division position so as to be horizontally aligned in accordance with a user's operation of drawing a line at the division position of the screen, and accordingly, the user can direct to perform the vertical division display mode using an intuitive operation.

Third Embodiment

Figure 13:
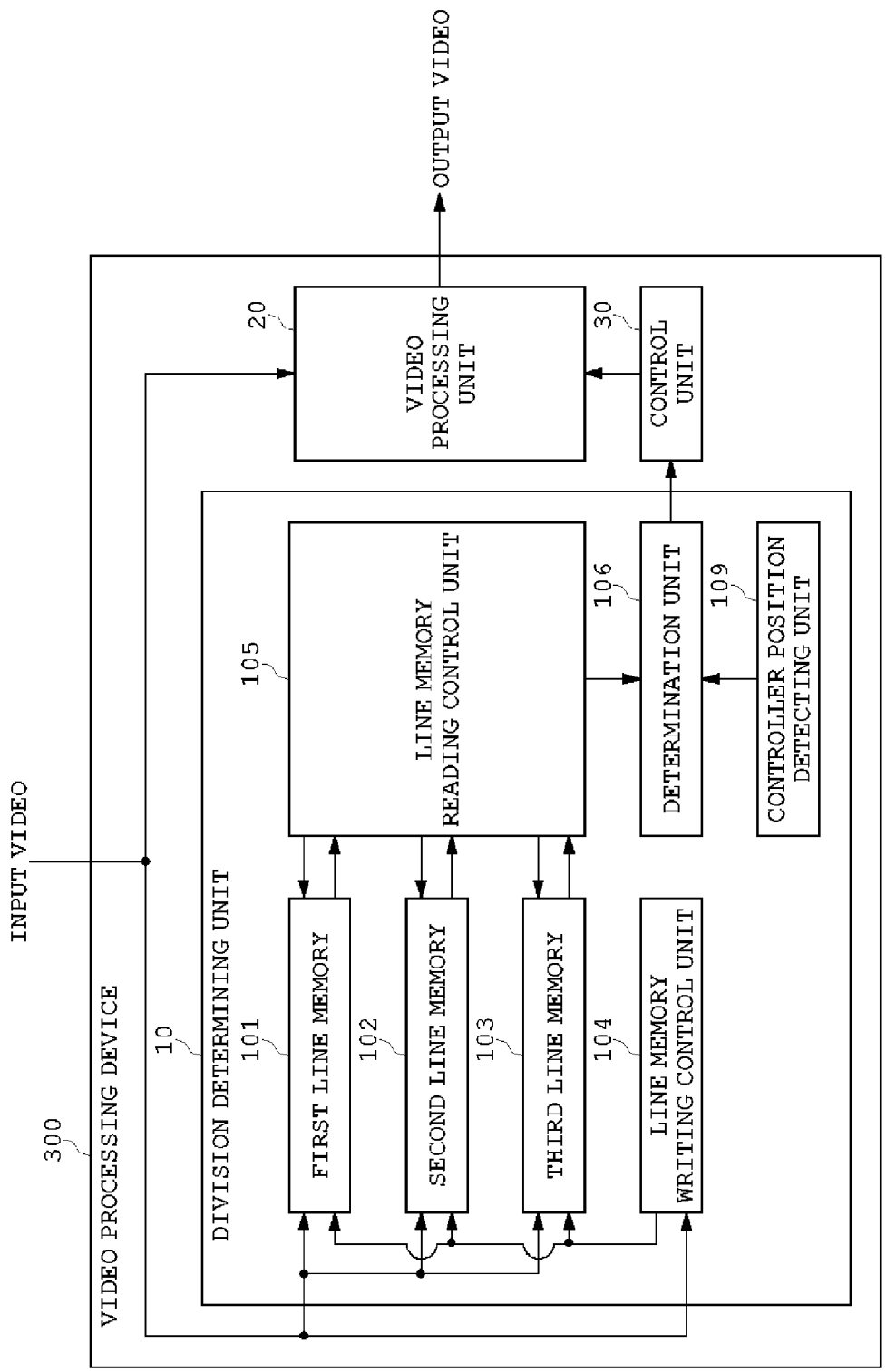
FIG. 13 is a block diagram that illustrates the configuration of a video processing device according to a third embodiment of the present invention.
Figure 14:
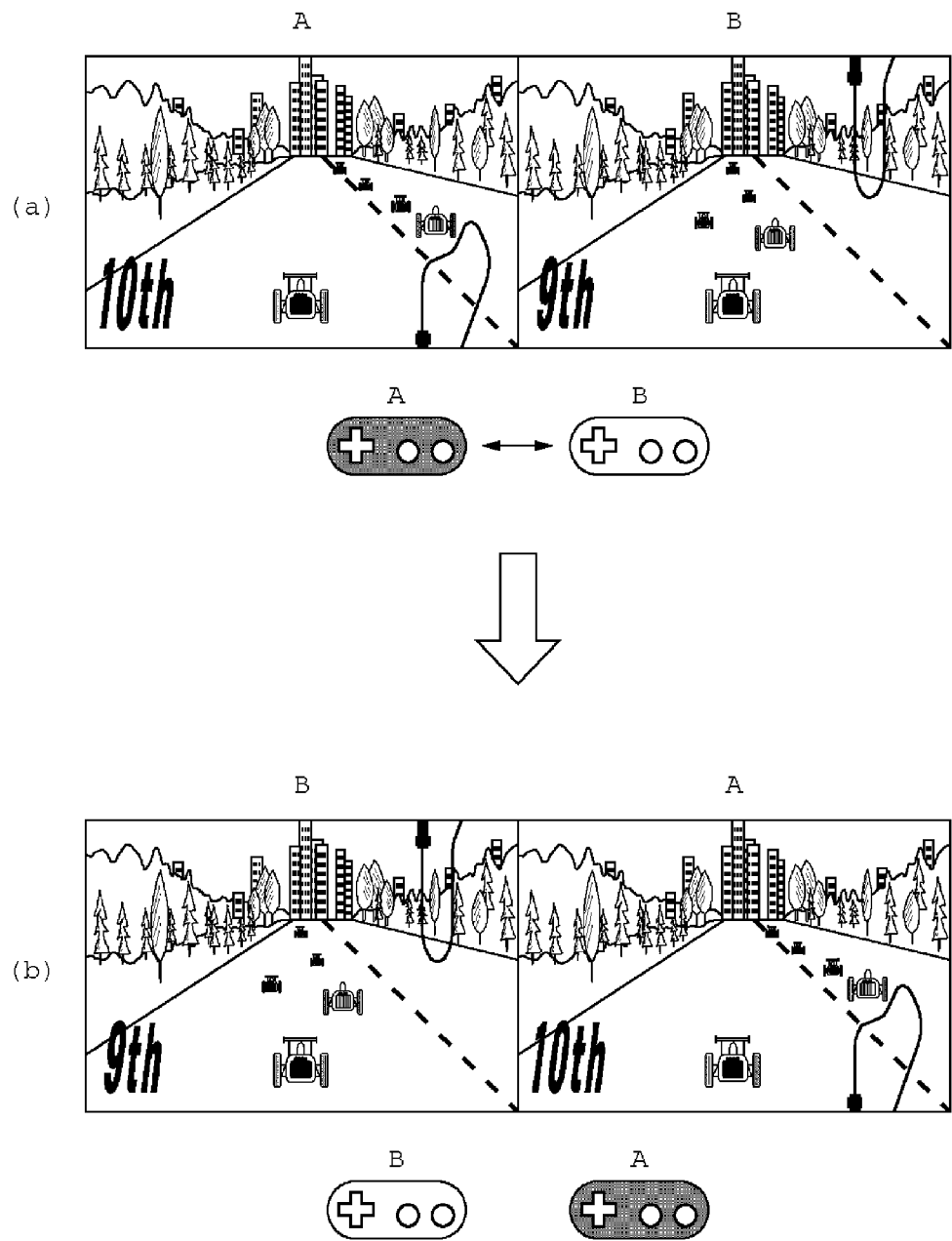
FIG. 14(a) is a diagram that illustrates an output video according to the third embodiment of the present invention.
FIG. 14(b) is a diagram that illustrates an output video according to the third embodiment of the present invention.

FIG. 13 is a block diagram that illustrates the configuration of a video processing device according to a third embodiment of the present invention. The video processing device 300 according to this embodiment is acquired by adding a function to the video processing device 100 according to the first embodiment. In addition, this function may be added also to the video processing device 200 according to the second embodiment. The video processing device 300 according to this embodiment, particularly, is appropriately used in a case where a video of a game is displayed on a display.

In the video processing device 300 according to this embodiment, a controller position detecting unit 109 is added to the video processing device 100 according to the first embodiment. In a case where there are two game controllers, the controller position detecting unit 109 detects the positions of the controllers and outputs a detection signal to the determination unit 106. The determination unit 106 outputs a determination result representing which controller is on the right side and which controller is on the left side to the control unit 30 based on the positions of the two controllers.

The control unit 30 outputs this determination result to the video processing unit 20 as a control signal. The video processing unit 20 changes read positions according to the first and second memory reading control units 204 and 205 based on the control signal representing the horizontal positional relation of the two controllers. Under the control of the video processing control unit 206, in a case where one of the first and second memory reading control units 204 and 205 performs reading from a lead line of the video of the upper area of the input video, and the other performs reading from a lead line of the video of the lower area, when the horizontal positional relation of the two controllers is reversed, the video processing control unit 206 controls the first and second memory reading control units 204 and 205 such that one of the first and second memory reading control units 204 and 205 performs reading from the lead line of the video of the lower area of the input video, and the other performs reading from the lead line of the video of the upper area.

As above, according to the video processing device 300 of the third embodiment, in a case where the input video is a video of a game played by two players, videos representing the play statuses of the players are vertically aligned, and the input video is divided into upper and lower areas, and videos of the areas are compressed and/or expanded and then are horizontally aligned to be displayed, it is determined which one of the videos of the upper and lower areas is arranged on the left side or the right side in accordance with the actual locations of the players, whereby a video can be displayed in which the sense of presence of two players are improved.

Fourth Embodiment

Figure 15:
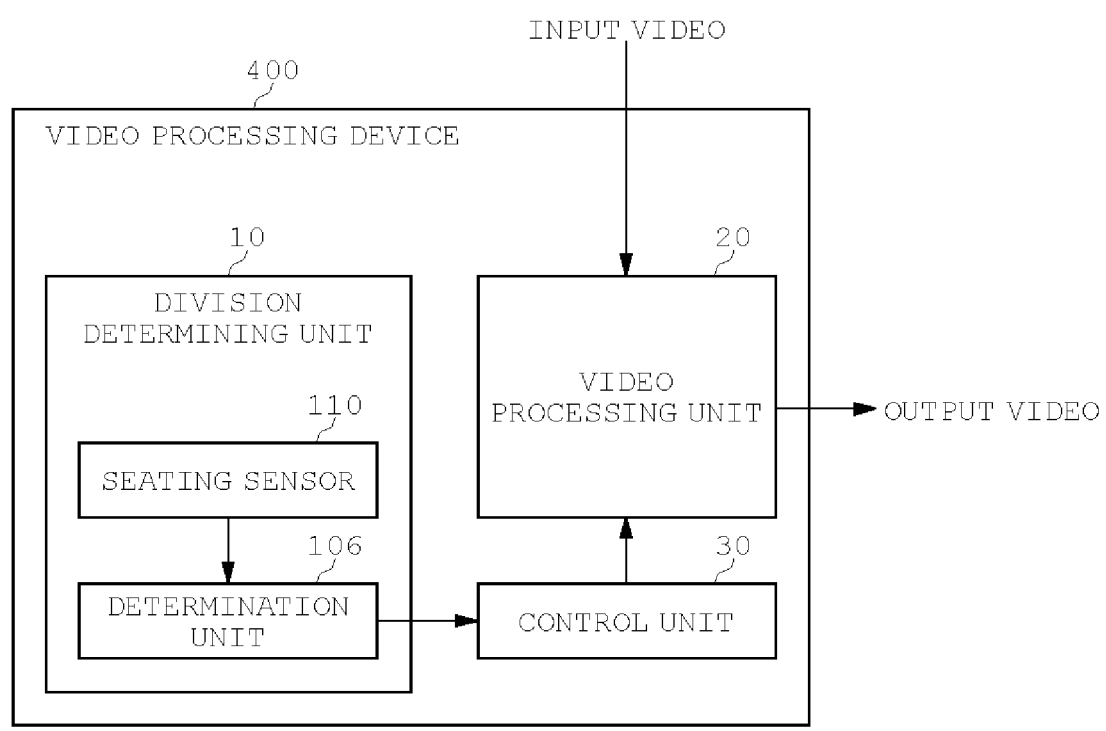
FIG. 15 is a block diagram that illustrates the configuration of a video processing device according to a fourth embodiment of the present invention.

FIG. 15 is a block diagram that illustrates the configuration of a video processing device according to a fourth embodiment. The video processing device 400 according to this embodiment is appropriately applied to a display used for being viewed by a passenger seated on the rear seat of a vehicle.

The video processing device 400 according to this embodiment includes a division determining unit 10, a video processing unit 20, and a control unit 30. The division determining unit 10 according to this embodiment includes a seating sensor 110 and a determination unit 106. The seating sensor 110 may be included in seats for two persons (for example, the rear seats of a vehicle) that are aligned before a display in a direction parallel to the horizontal direction of the display. The seating sensor 110 detects whether or not a person is seated and outputs a detection result to the determination unit 106.

In a case where a detection result acquired by the seating sensor 110 represents that persons are seated on both seats for two persons, the determination unit 106 outputs a determination result indicating that the input video is vertically divisible. When the determination result indicating that the input video is vertically divisible is received from the determination unit 106, the control unit 30, similarly to Step S93 in the example illustrated in FIG. 9, the control unit 30 adds a vertical division display mode as a display mode. Then, when the vertical division display mode is directed in accordance with a user's operation, the control unit 30 outputs a control signal to the video processing unit 20 so as to perform a display in the vertical division display mode. At this time, the division position is at the center in the vertical direction.

As above, according to the video processing device 400 according to the fourth embodiment, in a case where there are two persons (users) before the display, the vertical division display mode is added in accordance therewith, and accordingly, the user can select the vertical division display mode as a display mode.

Fifth Embodiment

Figure 16:
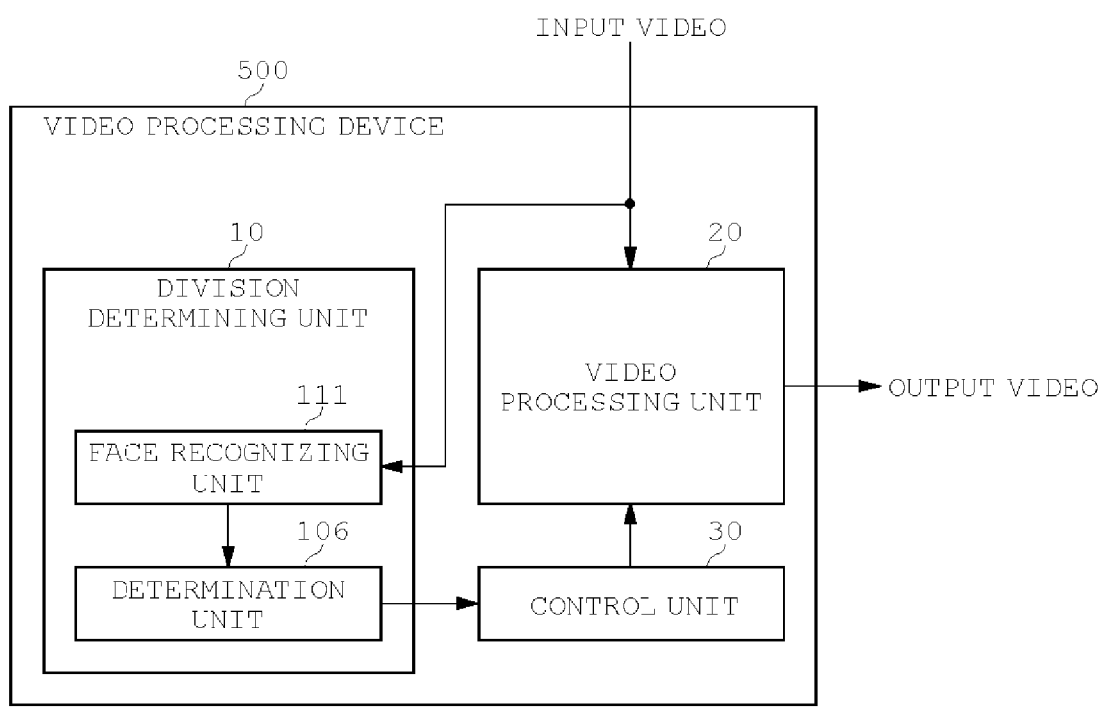
FIG. 16 is a block diagram that illustrates the configuration of a video processing device according to a fifth embodiment of the present invention.

FIG. 16 is a block diagram that illustrates the configuration of a video processing device according to a fifth embodiment of the present invention. The video processing device 500 of this embodiment includes a division determining unit 10, a video processing unit 20, and a control unit 30. The division determining unit 10 includes a face recognizing unit 111 and a determination unit 106.

An input video is input to the face recognizing unit 111. The face recognizing unit 111 recognizes a face area in the input video and outputs the face area to the determination unit 106. For this face recognition, an arbitrary known technology such as template matching or feature point matching may be employed. The face recognizing unit 111 specifies a rectangular face area including a face and outputs a result thereof to the determination unit 106. At this time, the aspect ratio of the face area is an aspect ratio in a case where the display is horizontally divided. In other words, when the aspect ratio of the display is horizontal:vertical=a:b, the aspect ratio of a face area is horizontal:vertical=a/2:b. In other words, since the aspect ratio of an area determined as a face is not limitable, the face recognizing unit 111 specifies a face area such that the aspect ratio of an image including a face and the periphery thereof is horizontal:vertical=a/2:b.

When the face area is input from the face recognizing unit 111, the determination unit 106 outputs a determination result indicating that a display can be performed in a face enlarged display mode in which a face area, which is a partial area of the video, is divisionally displayed in an enlarged scale to the control unit 30. In this determination result, information of the face area is included. The control unit 30 outputs a control signal used for performing a display in the face enlarged display mode to the video processing unit 20 according to the examples illustrated in FIGS. 5 to 9. Also in this control signal, the information of a face area is included. Here, the face enlarged display mode is one kind of a division display mode according to the present invention.

Figure 17:
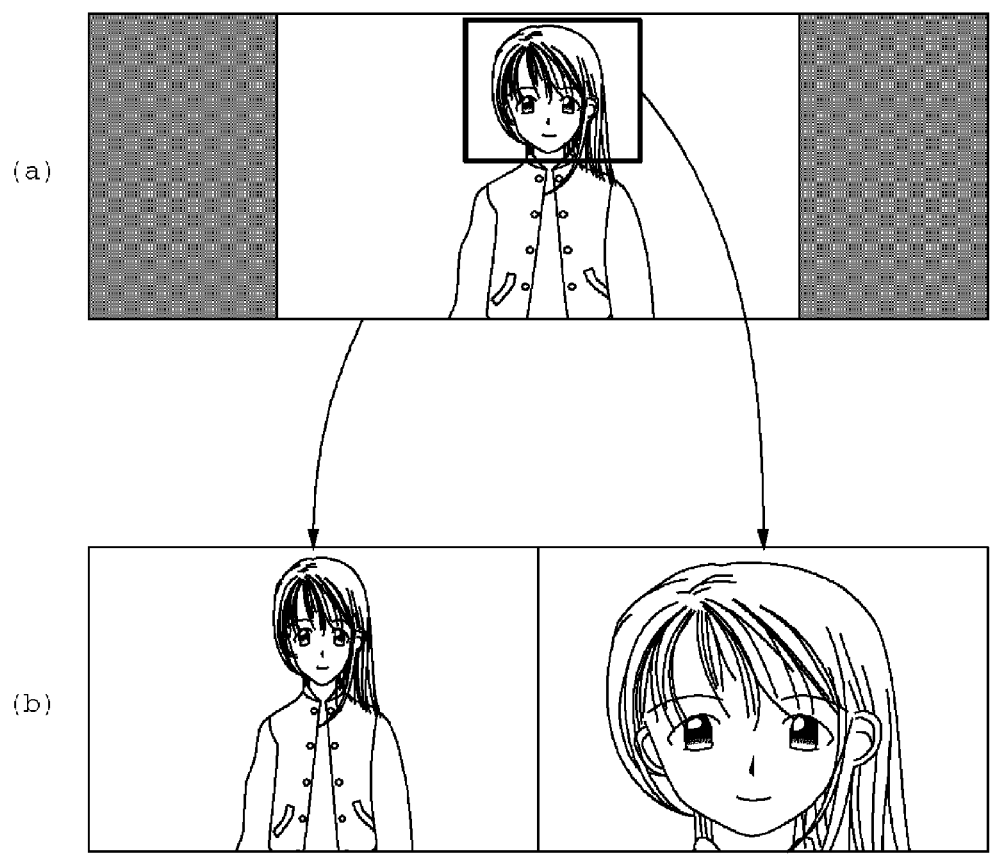
FIG. 17(a) is a diagram that illustrates an input video according to the fifth embodiment of the present invention.
FIG. 17(b) is a diagram that illustrates an output video according to the fifth embodiment of the present invention.

FIG. 17(a) is a diagram that illustrates an input video including a person's face, and FIG. 17(b) is a diagram that illustrates a screen on which the input video illustrated in FIG. 17(a) is displayed in the face enlarged display mode. The video processing unit 20 has the configuration illustrated in FIG. 1. In any one of the first and second memories 201 and 202, the input video illustrated in FIG. 17(a) is stored.

The video processing control unit 206 controls the first memory reading control unit 204 so as to read the whole input video from the first memory 201 and controls the second memory reading control unit 205 so as to read only a face area from the second memory 202. The compression/expansion control unit 207 compresses and/or expands the input video read by the first memory reading control unit 204 to be fit into the left half of the display, as illustrated in FIG. 17(b), and compresses and/or expands the face area read by the second memory reading control unit 205 to be fit into the right half of the display, as illustrated in FIG. 17(b). The image composing unit 208 composes both videos compressed and/or expanded by the compression/expansion control unit 207 and outputs a resultant video as an output video.

As above, according to the video processing device 500 of the fifth embodiment, a face area is detected from an input video, and the face area is enlarged and can be displayed together with the whole input video, whereby an easily viewable video can be displayed by utilizing a broader area in the display.

First Modified Example of Fifth Embodiment

FIG. 18 is a diagram that illustrates a first modified example of the fifth embodiment. In the above-described fifth embodiment, while the face recognizing unit 111 detects a face area from an input video by performing the image recognizing process, in this modified example, the display is configured as a touch panel, and a user can indicate a rectangular area desired to be divided and displayed in an enlarged scale by surrounding the rectangular area with a finger as illustrated in FIG. 18(a). In a screen of the face enlarged display mode, as illustrated in FIG. 18(b), the entire area of the input video is displayed on the left side, and the rectangular area designated by the user is displayed on the right side.

This modified example can be realized by employing the same configuration as that of the second embodiment. In addition, the rectangular area designated by the user may be directly compressed and/or expanded to be of a size that is a half of the display. In such a case, when the aspect ratio of the area designated by the user does not match the aspect ratio of the right half of the display, compression/expansion may be performed with the aspect ratio of the area designated by the user being maintained, and the display may be performed with black belts attached to the left and right sides or the upper and lower sides. In addition, based on the rectangular area designated by the user, a rectangular area may be formed which includes the rectangular area designated by the user and displays a minimum rectangular area of which the aspect ratio is a half (horizontal:vertical=half of width of display: height of display) of the display in an enlarged scale. In any one of the above-described cases, the aspect ratio of the video portion on the right side that is displayed in an enlarged scale does not change from the aspect ratio of the input video even by the compression and/or expansion process, and accordingly, formation of a video that is vertically or horizontally broken can be avoided.

In addition, in the above-described fifth embodiment, a face area is automatically detected for each frame, and accordingly, the position and the size of the face area change for each frame. In contrast to this, in this modified example, since a rectangular area to be enlarged is designated by the user, in a case where this rectangular area is fixed, although a person's face is in the rectangular area at the time of the designation, there cases where the face is not projected in the rectangular area or exceeds the rectangular area in accordance with a change in the video. Accordingly, this modified example is appropriately used for viewing a still image. However, since the rectangular area designated by the user is not limited to a person's face area, there are cases where it is effective to divisionally display the video after fixing the rectangular area in accordance with the specific content of the video, and accordingly, this modified example is not necessarily limited to the purpose of viewing a still image.

Second Modified Example of Fifth Embodiment

Figure 19:
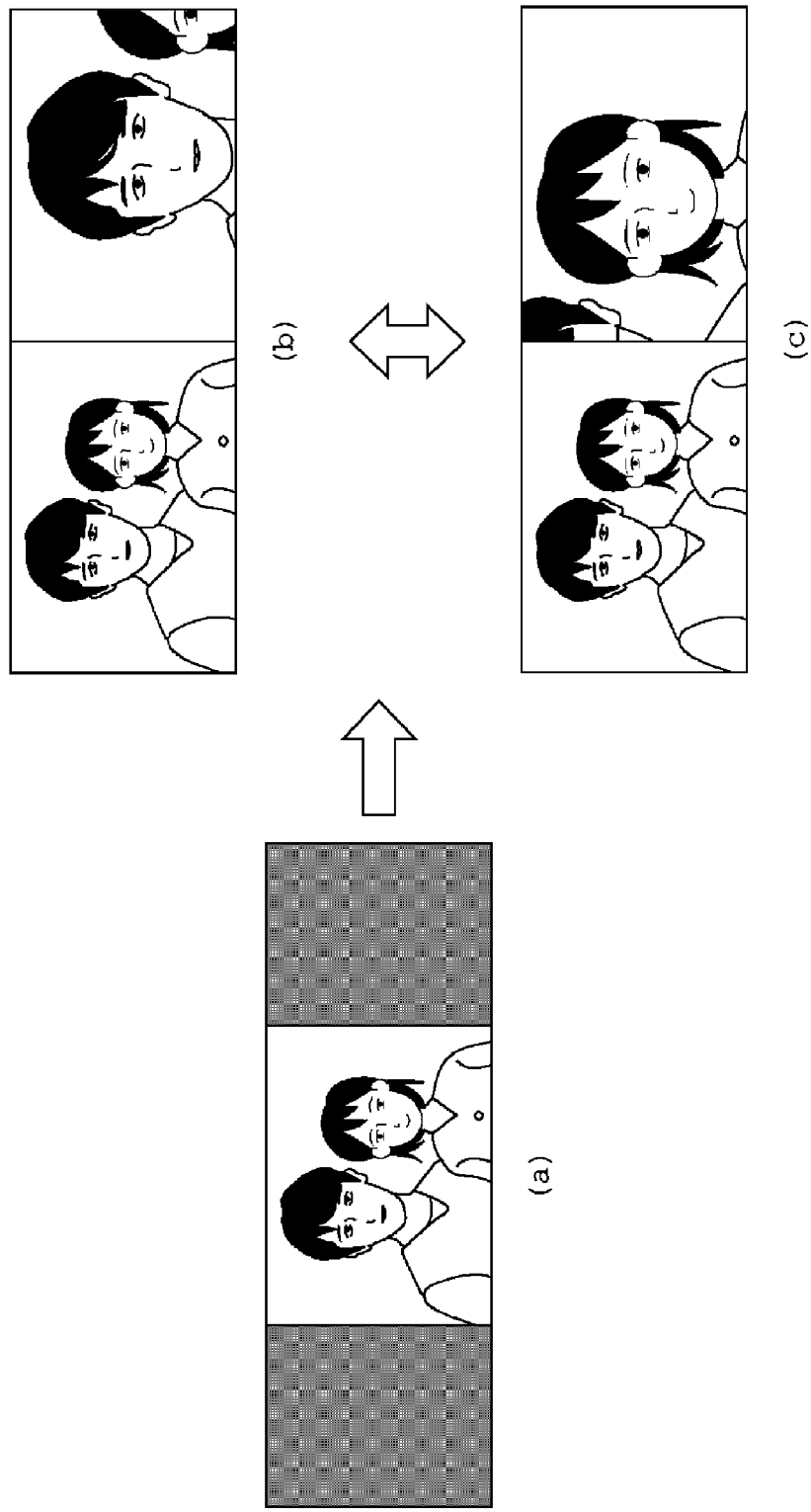
FIG. 19(a) is a diagram that illustrates an input video according to a second modified example of the fifth embodiment of the present invention.
FIG. 19(b) is a diagram that illustrates an output video according to the second modified example of the fifth embodiment of the present invention.
FIG. 19(c) is a diagram that illustrates an output video according to the second modified example of the fifth embodiment of the present invention.

FIG. 19 is a diagram that illustrates a second modified example of the fifth embodiment. This modified example may be applied to the above-described fifth embodiment and the first modified example thereof. This modified example, as illustrated in FIG. 19(a), is effective in a case where there is a plurality of faces (in the example illustrated in FIG. 19(a), a man's face and a woman's face) in the input video. This modified example relates to a display method in a case where a plurality of faces is detected or designated in the input video.

In a case where there is a plurality of areas to be enlarged, as illustrated in FIGS. 19(b) and 19(c), the whole input video is displayed on the left side, and a plurality of areas to be enlarged is sequentially displayed on the right side in a switched manner. Accordingly, the video processing control unit 206 of the video processing unit 20 controls the first memory reading control unit 204 so as to read the whole input video from the first memory 201 and controls the second memory reading control unit 205 so as to change an area to be read from the second memory 202 for every predetermined number of frames (for example, 180 frames). As a result, switching between a video displaying a man's face in an enlarged scale as in FIG. 18(b) and a video displaying a woman's face in an enlarged scale as in FIG. 18(c) is performed for every 180 frames.

In addition, when switching between videos displayed in an enlarged scale as described above is regularly performed, on the side on which the whole input video is displayed, a portion of the whole video at which the video displayed in an enlarged scale is located may be represented by attaching a marker by surrounding an area corresponding to the video displayed in an enlarged scale or the like. Furthermore, markers may be attached to all the areas detected or designated as areas that are displayed in an enlarged scale, and a marker of the area corresponding to the video that is actually displayed in the enlarged scale may be displayed to be discriminated from the other markers (for example, the markers are represented in mutually-different colors or the like).

Furthermore, in the description presented above, in a case where a plurality of face areas is detected or designated, although the plurality of areas is sequentially displayed with being automatically switched from each other (slide show), the switching between the areas to be displayed in an enlarged scale may be performed in accordance with a user's operation. Even in such a case, a marker may be attached by surrounding an area corresponding to a video displayed in an enlarged scale or the like, or a marker of an area corresponding to a video that is actually displayed in an enlarged scale may be displayed to be discriminated from the other markers (for example, the markers are represented in mutually-different colors or the like) by attaching markers to all the areas detected or designated as areas to be displayed in an enlarged scale. Particularly, in the latter case, the user can select a face area to be displayed in an enlarged scale while checking the whole input video in which markers are attached to a plurality of face areas.

According to this modified example, even in a case where there is a plurality of areas of the input video to be displayed in an enlarged scale, a plurality of enlarged areas can be displayed.

In addition, in the above-described embodiment, while the video processing unit 20 includes two memories, which are the first and second memories and displays a video that are horizontally divided into two in the vertical division display mode, the present invention is not limited thereto. For example, the video processing unit 20 may include three memories and display videos that are horizontally divided into three in the vertical division display mode.

Furthermore, in the above-described embodiment, in the output video, while the boundary between the video disposed on the left side and the video disposed on the right side is located at the center of the output video in the row direction, the boundary between the video disposed on the left side and the video disposed on the right side may be arbitrarily set. For example, in the above-described fifth embodiment, the output video may be generated such that the input video having an aspect ratio of 16:9 is displayed on the left side in the output video with the aspect ratio being maintained, and the video of a face area is displayed in the remaining area on the right side.

In addition, in the above-described embodiment, although the size of the output video matches the size of the display, and, in order to display the output video on the display, the output video is displayed using the entire area of the display, a black belt may be generated in a part of the display when the output video is displayed.

While the preferred embodiments of the present invention, which are considered at the current time point, have been described, these embodiments may be variously changed, and all such changes within the true spirit and the scope of the present invention are intended to be included in the attached claims.

INDUSTRIAL APPLICABILITY

As above, the present invention has an advantage of being capable of displaying an easily viewable video by utilizing a broader area in a horizontally long display and is useful as a video processing device that processes an input video.

REFERENCE SIGNS LIST

100, 200, 300, 400, 500 video processing device
10 division determining unit
101 first line memory
102 second line memory
103 third line memory
104 line memory writing control unit
105 line memory reading control unit
106 determination unit
107 touch panel
108 touch area detecting unit
109 controller position detecting unit
110 seating sensor
111 face recognizing unit
20 video processing unit
201 first memory
202 second memory
203 memory writing control unit
204 first memory reading control unit
205 second memory reading control unit
206 video processing control unit
207 compression/expansion control unit
208 image composing unit
30 control unit

The invention claimed is:

1. A video processing device comprising a video processing unit that processes an input video,
wherein the video processing unit comprises:
a first memory that stores an image corresponding to the input video;
a second memory that also stores the image corresponding to the input video;
said image stored in said first memory and said image stored in said second memory appear identical;
a compression/expansion control unit that compresses and/or expands a first area of the image stored in the first memory and compresses and/or expands a second area of the image stored in the second memory, wherein said first area and said second area are different; and
an image composing unit that generates an output video in which a video of the first area compressed and/or expanded by the compression/expansion control unit and a video of the second area compressed and/or expanded by the compression/expansion control unit are horizontally aligned, wherein
said video processing device displays said output video in which the two videos are horizontally aligned in the entire area of a display which is connected to said video processing device.

2. The video processing device according to claim 1, wherein the first area is an upper area of the input video, and the second area is a lower area of the input video.

3. The video processing device according to claim 1, wherein the first area is the entire area of the input video, and the second area is a rectangular area of the input video that is smaller than the entire area.

4. The video processing device according to claim 1, further comprising a division control unit that determines whether or not a display can be made in a division display mode in which the output video generated by the image composing unit is displayed and controls the video processing unit.

5. The video processing device according to claim 4, wherein the division control unit determines whether the input video has a boundary between an upper area and a lower area thereof and, in a case where the input video has the boundary, controls the video processing unit so as to generate an output video for performing a display in the division display mode with an upper area set as the first area and a lower area set as the second area.

6. The video processing device according to claim 4, wherein the division control unit determines whether the input video has a boundary between an upper area and a lower area thereof and, in a case where the input video has the boundary, adds a division display mode in which the output video generated by the image composing unit is displayed as a display mode and controls the video processing unit so as to generate an output video for performing a display in the division display mode with an upper area set as the first area and a lower area set as the second area when the division display mode is selected by a user.

7. The video processing device according to claim 4, wherein the division control unit controls the video processing unit so as to generate an output video for performing a display in the division display mode with an area disposed on an upper side of a division position set as the first area and an area disposed on a lower side of the division position set as the second area in accordance with a user's instruction including designation of the division position used for vertically dividing the input video.

8. The video processing device according to claim 4, wherein the division control unit detects a face area from the input video and controls the video processing unit so as to generate an output video for performing a display in the division display mode with the entire area of the input video set as the first area and the face area set as the second area when the face area is detected from the input video.

9. The video processing device according to claim 4, wherein the division control unit detects a face area from the input video, when the face area is detected from the input video, adds a division display mode in which the output video generated by the image composing unit is displayed as a display mode, and controls the video processing unit so as to generate an output video for performing a display in the division display mode with the entire area of the input video set as the first area and the face area set as the second area when the division display mode is selected by a user.

10. The video processing device according to claim 4, wherein the division control unit controls the video processing unit so as to generate an output video for performing a display in the division display mode with the entire area of the input video set as the first area and a partial area set as the second area in accordance with a user's instruction including designation of the partial area of the input video.

11. A video display system comprising:
the video processing device according to claim 1; and
a display that displays the output video.

12. A video display system comprising:
the video processing device according to claim 2; and
a display that displays the output video.

13. A video display system comprising:
the video processing device according to claim 3; and
a display that displays the output video.

14. A video display system comprising:
the video processing device according to claim 4; and
a display that displays the output video.

15. A video display system comprising:
the video processing device according to claim 5; and
a display that displays the output video.

16. A video display system comprising:
the video processing device according to claim 6; and
a display that displays the output video.

17. A video display system comprising:
the video processing device according to claim 7; and
a display that displays the output video.

18. A video display system comprising:
the video processing device according to claim 8; and
a display that displays the output video.

19. A video display system comprising:
the video processing device according to claim 9; and
a display that displays the output video.

20. A video display system comprising:
the video processing device according to claim 10; and
a display that displays the output video.

* * * * *